United States Patent
Hahn

(10) Patent No.: US 8,416,344 B2
(45) Date of Patent: Apr. 9, 2013

(54) ITERATIVE METHOD FOR INTERPOLATING VIDEO INFORMATION VALUES

(75) Inventor: Marko Hahn, Neubiberg (DE)

(73) Assignee: Entropic Communications, Inc., San Diego, CA (US)

( * ) Notice: Subject to any disclaimer, the term of this patent is extended or adjusted under 35 U.S.C. 154(b) by 1076 days.

(21) Appl. No.: 12/058,280

(22) Filed: Mar. 28, 2008

(65) Prior Publication Data

US 2008/0246877 A1 Oct. 9, 2008

(30) Foreign Application Priority Data

Mar. 28, 2007 (DE) .......................... 10 2007 015 002

(51) Int. Cl.
*H04N 7/01* (2006.01)
(52) U.S. Cl.
USPC .......................... 348/452; 348/442; 382/265
(58) Field of Classification Search .......... 348/441–459, 348/699–701; 382/265, 299–301
See application file for complete search history.

(56) References Cited

U.S. PATENT DOCUMENTS

| 4,771,331 | A | 9/1988 | Bierling et al. | 358/136 |
| 5,148,269 | A | 9/1992 | de Haan et al. | 358/105 |
| 5,446,497 | A * | 8/1995 | Keating et al. | 348/443 |
| 5,526,053 | A * | 6/1996 | Dorricott et al. | 348/443 |
| 5,703,966 | A * | 12/1997 | Astle | 382/236 |
| 5,777,682 | A | 7/1998 | De Haan et al. | |
| 6,229,570 | B1 | 5/2001 | Bugwadia et al. | 348/441 |
| 7,142,249 | B2 | 11/2006 | Hahn et al. | 348/458 |
| 7,375,763 | B2 * | 5/2008 | Alfonso et al. | 348/448 |
| 7,843,509 | B2 * | 11/2010 | Hahn et al. | 348/448 |
| 2001/0002205 | A1 | 5/2001 | Beattie | |
| 2002/0159527 | A1 | 10/2002 | Pelagotti et al. | |
| 2004/0071313 | A1* | 4/2004 | Hahn et al. | 382/100 |
| 2005/0135485 | A1 | 6/2005 | Nair et al. | |
| 2006/0274834 | A1 | 12/2006 | Hahn et al. | |
| 2007/0236601 | A1 | 10/2007 | Hahn et al. | 348/441 |

FOREIGN PATENT DOCUMENTS

| DE | 102 36 207 A1 | 2/2004 |
| DE | 102005046772 A1 | 4/2007 |
| EP | 0236519 A1 | 9/1987 |
| EP | 00886445 A2 | 12/1998 |
| EP | 01729258 A2 | 12/2006 |
| GB | 02283385 A | 5/1995 |
| WO | 9628931 A2 | 9/1996 |
| WO | 0188852 A2 | 11/2001 |
| WO | 02056589 A1 | 7/2002 |
| WO | 2005027525 A1 | 3/2005 |

* cited by examiner

*Primary Examiner* — Annan Shang
(74) *Attorney, Agent, or Firm* — Bruce Greenhaus; Duane Morris LLP

(57) ABSTRACT

The invention relates to an iterative method for determining an interpolated video information value in an image that exhibits a number of image regions arrayed for example in matrix fashion, at least one of which is an image region to be interpolated, and that is disposed temporally between a first image and a second image of an image sequence.

13 Claims, 22 Drawing Sheets

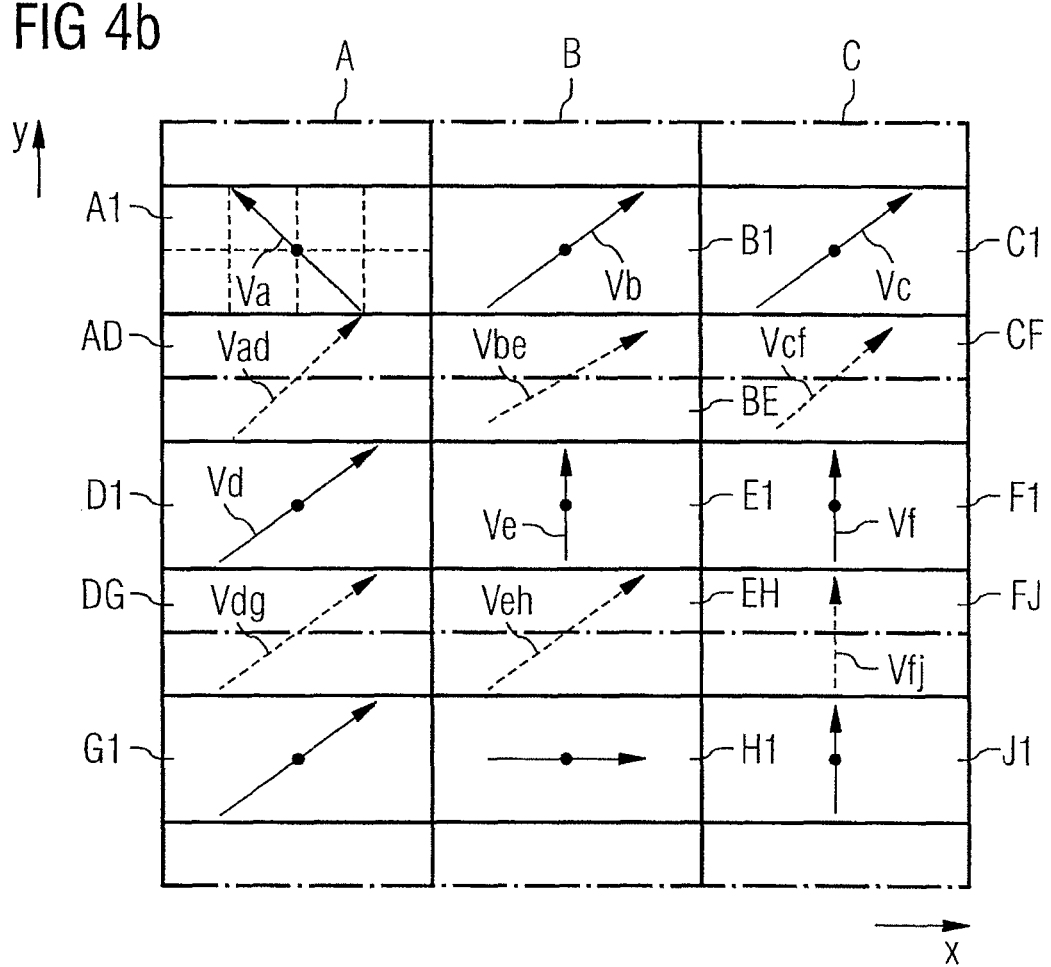

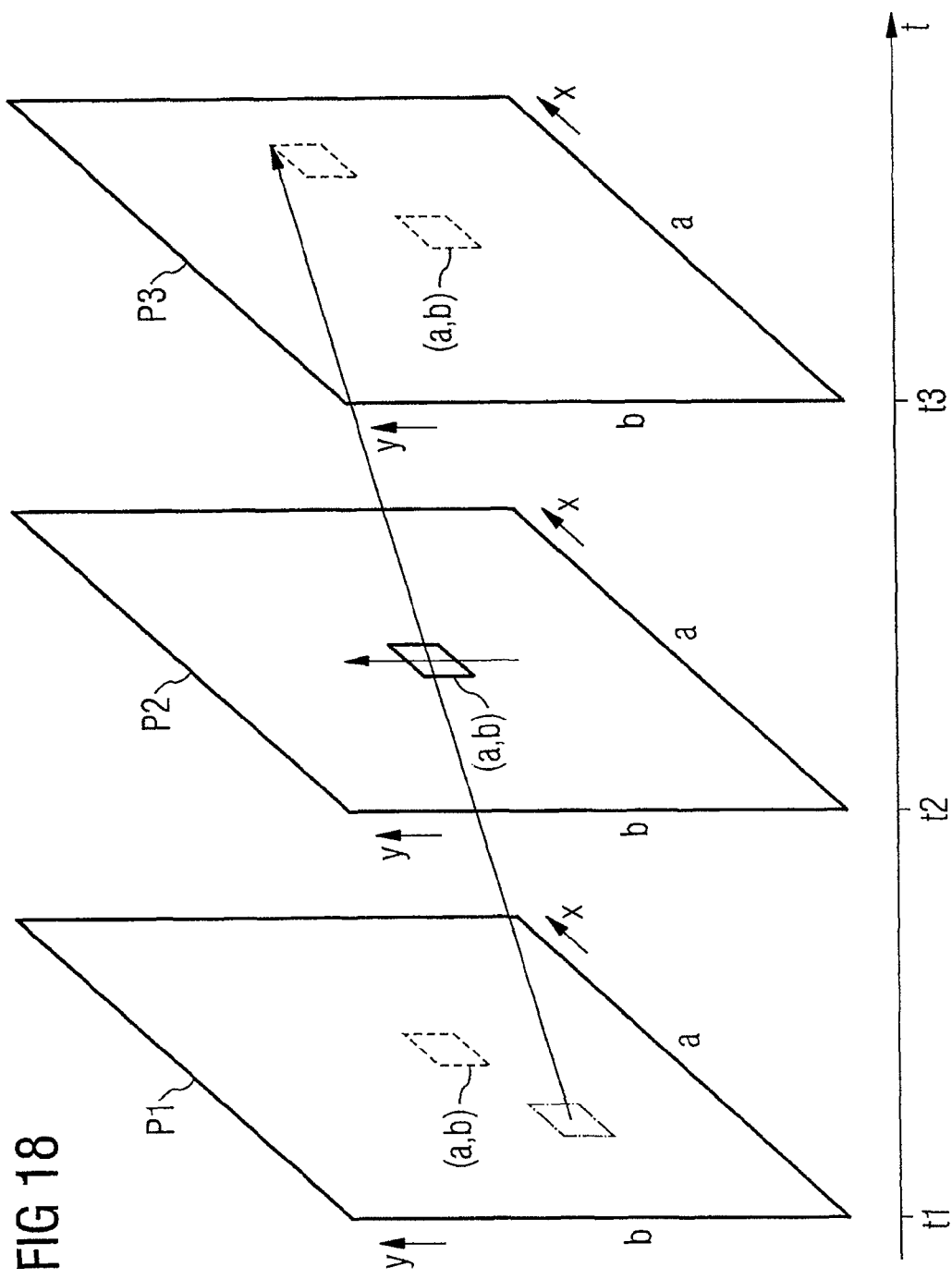

ITERATIVE METHOD FOR INTERPOLATING VIDEO INFORMATION VALUES

PRIORITY INFORMATION

This patent application claims priority from German patent application 10 2007 015 026.6 filed Mar. 28, 2007, which is hereby incorporated by reference.

BACKGROUND OF THE INVENTION

The invention relates to an iterative interpolation technique for determining at least one interpolated video information value in an image that exhibits a number of image regions arrayed in matrix fashion having at least one image region to be interpolated.

Interpolation techniques for determining a video information value for an image region are required in image processing for a variety of intended applications.

One intended application is the generation of frames from fields transmitted in television technology. Here, between every two lines of an existing field, an intermediate line having a number of pixels is interpolated in order to obtain a frame. An interpolation method for generating such intermediate lines is described for example in DE 102 32 372 A1 (Hahn et al.).

A further intended application for an interpolation method is the enhancement of image resolution. Here, between existing lines and columns of an image, further lines and columns are generated by interpolation in order to enhance the image resolution. A method for this purpose is described for example in U.S. Pat. No. 6,229,570 B1 (Bugwadia et al.).

Interpolation methods are further needed in video transmission methods in which an image to be transmitted is divided into image blocks and transmitted blockwise. If a block is not transmitted or is transmitted with errors because of a transmission error, its video content is to be interpolated at the receiver end. A method for this purpose is described for example in Meisinger and Kaup, "Frequency-Selective Extrapolation for Spatial Error Masking of Video Data Received with Interference," "Electronic Media," 10th Dortmund Television Seminar, ITG Technical Report 179, September 2003, pages 189-194.

A further intended application for interpolation methods in image processing is to enhance the resolution of a motion-vector field. It is sufficiently well known in image processing to divide into individual image blocks an image that is part of an image sequence having a plurality of successive images and to associate a motion vector with each of these image blocks using a motion estimation technique. These vectors jointly form a motion-vector field. Such a motion vector associated with a block contains an item of information as to the position in a preceding and/or succeeding image of the image sequence in which the content of this block is again found. This item of information can be used for directionally correct generation of intermediate images between two images of an image sequence. In motion estimation it is desirable to obtain the smallest possible blocks with each of which a motion vector is associated. This, however, increases the effort in motion estimation.

In order to hold this effort for motion estimation within limits, it is known to enhance the resolution of the vector field after motion estimation by dividing the initially existing image blocks into smaller blocks with which motion vectors are associated by the use of an interpolation technique in a fashion taking account of the motion vectors of the larger original blocks. A method for this purpose is described for example in U.S. Pat. No. 5,148,269 (de Haan et al.).

A further intended purpose for interpolation methods is to generate intermediate images that are disposed temporally between existing images of an image sequence.

There is a need for an improved interpolation technique for determining at least one interpolated video information value in an image that exhibits a number of image regions arrayed in matrix fashion, of which at least one image region is to be interpolated, and that is disposed temporally between at least two images.

SUMMARY OF THE INVENTION

The method according to an aspect of the invention is applied to an image sequence having a number of images, which is divided into a number of image regions, several of the image regions already having respective video information values associated with them. Image regions with which a video information value has already been associated, and for which no video information value need be interpolated, are referred to as "original image regions" in what follows.

At least one of the images of the image sequence furthermore comprises at least one image region to be interpolated, for which a video information value is to be interpolated. In what follows, this video information value is referred to as an "interpolated video information value."

Each image region comprises at least one pixel and thus can be made up of a single pixel or a plurality of pixels arrayed for example in matrix fashion. An image region having a plurality of pixels is referred to as an "image block" in what follows.

A video information value may be a luminance value (lightness value), a chrominance value (color value) or also a motion-vector value, the last of these possibly comprising two motion-vector components.

An iterative technique for determining an interpolated video information value in an image that exhibits a number of image regions arrayed in matrix fashion, of which at least one is an image region to be interpolated, and that is disposed temporally between a first image and a second image of an image sequence, comprises:

a) specifying a starting motion vector;
b) determining for the starting motion vector a figure of merit, which depends on video information values of at least one group of image regions, this group of image regions comprising at least one image region in the first image, at least one image region in the second image and at least one image region in the image to be interpolated, the position of these image regions in the images being specified by the starting motion vector;
c) selecting at least one motion vector distinct from the starting motion vector and determining for this at least one motion vector a figure of merit, which depends on video information values of at least one group of image regions, this group of image regions comprising at least one image region in the first image, at least one image region in the second image and at least one image region in the image to be interpolated, the position of these image regions in the images being specified by this motion vector;
d) comparing the figure of merit for the starting motion vector and the at least one motion vector distinct from the starting motion vector, selecting the starting motion vector or the at least one other motion vector in dependence on the comparison result and determining an interpolated video information value by employing image regions that lie in the first and second images at positions specified by the selected motion vector or specified by a motion vector obtained by filtering the selected motion vector;

e) repeating steps c) and d) at least once, the motion vector selected in the preceding step d) being employed as the starting motion vector, and the figure of merit of this selected motion vector as the figure of merit of the starting motion vector, when step c) is next performed.

The term "interpolation direction" denotes an image direction lying within an image, in which direction the image regions whose video information values are used for determining the interpolated video information value lie adjacent one another. "Motion vector" denotes an across-images interpolation direction, items of video information of image regions lying on the motion vector in distinct images being employed for interpolation.

The figure of merit for an image direction or motion vector, which is determined on the basis of at least one group of image regions that lie adjacent in this image direction or that are disposed at positions specified by the motion vector, is determined in such fashion that it contains an item of information concerning how much the video information values of this group deviate from one another. A direction/vector is deemed better, or the "quality" of this direction/vector higher, the less the video information values lying adjacent in this direction or the video information values specified by the vector deviate from one another. The figure of merit can thus be so generated that it increases with increasing quality of an image direction or decreases with decreasing quality of an image direction.

In the comparison of figures of merit in step d), the direction or vector for which the comparison of figures of merit yields the highest quality is selected as interpolation direction.

One option for determining a figure of merit for an image direction/vector using at least one group of image regions is to subject the video information values of these image regions to high-pass filtering in order to obtain a high-pass filter value. The figure of merit is then formed by the absolute value of this high-pass filter value or a power of this high-pass filter value with an exponent that is a multiple of two. When the figure of merit is determined in this way, its value is smaller the less the video information values of the image regions of the group under consideration deviate from one another.

In what follows, the term "individual figure of merit" denotes a figure of merit determined using only one group of image regions. A plurality of individual figures of merit are preferably determined in order to determine the figure of merit for an image direction/vector; that is, a plurality of groups having image regions are examined. The "individual figures of merit" here are for example added to obtain the figure of merit for the image direction/vector.

Before the individual figures of merit are added, it is possible to weight these individual figures of merit and, indeed, to weight them in dependence on how far in the image the individual groups lie from the image region to be interpolated. A greater weight is then accorded to the individual figures of merit of groups disposed closer to the image region to be interpolated than to those farther away.

The qualities of at least two image directions/motion vectors are compared in each iteration, namely the quality of the image direction/vector that forms the starting interpolation direction/starting vector and the quality of at least one further image direction distinct from the starting interpolation direction or of a further vector distinct from the starting vector, and an interpolated video information value is furnished at the end of each iteration. This interpolated video information value represents the final video information value that is associated with the image region to be interpolated.

Steps c) and d) are preferably repeated until a specified end condition has been attained. In one embodiment, the end condition has been attained when a specified number of iterations have been performed. In another embodiment, the end condition has been attained when the figure of merit of the image direction that is selected as the interpolation direction satisfies a specified quality criterion, for example, when the quality figure lies above or below a specified threshold value, depending on the way in which the quality figure is determined.

It is also possible to combine the above-explained end conditions by assuming that the end condition holds when one of the above-explained end conditions has been attained.

With every iteration of the method, a new image direction/vector can be examined by determining the figure of merit, the best image direction or vector so far, that is, the image direction having the best figure of merit, being employed as starting interpolation direction during a further interpolation step.

The group of image regions used for determining the figure of merit for an image direction or motion vector can be so chosen that they contain the image region to be interpolated. In each iteration the interpolated video information value from the preceding iteration is employed as the video information value of the image region to be interpolated. At the beginning of the method, when no iteration has yet been completed, a starting interpolation value is generated in this case. What is employed for this purpose are video information values of image regions that lie adjacent one another in the starting interpolation direction and adjacent the image region to be interpolated or that are disposed at positions specified by the starting motion vector. This starting interpolation value can then be used in determining the figure of merit for the starting interpolation direction or the at least one further image direction.

The at least one group of image regions that are examined in order to determine the figure of merit for an image direction/motion vector can comprise at least one further image region to be interpolated. In this case, in determining the interpolated video information value for the one image region to be interpolated, the method is performed—in parallel for the image region to be interpolated and this at least one further image region to be interpolated—in such fashion that an interpolation value is determined for the at least one further image region to be interpolated before the figures of merit are determined for the starting interpolation direction/starting motion vector and the at least one further image direction.

The method can find a variety of uses in image processing. This method can be used for example in intermediate-line interpolation as already explained at the outset. The image here comprises a number of original lines each of which comprises a number of pixels with each of which a video information value is associated. At least one intermediate line, comprising a number of pixels to be interpolated, is to be interpolated between every two original lines. The individual pixels form in each case an image region for performing the method according to an aspect of the invention, and the method is applied to each pixel of an intermediate line to be interpolated.

The method according to an aspect of the invention is also suitable for interpolating image blocks that were not transmitted or were transmitted with errors in the transmission of video data. Since such an image block to be interpolated comprises a plurality of pixels arrayed for example in matrix fashion, the methods according to the invention is preferably performed multiple times in succession, the image regions to be interpolated being made smaller in size every time the method is performed.

Preferably the image block to be interpolated is initially taken as an image region to be interpolated, and a common video information value, that is, a common lightness value or chrominance value, is associated with this image region by the methods according to the invention. The resolution of the correctly transmitted image blocks of the image is initially made coarser for this purpose; that is, individual pixels in the surroundings of the image block to be interpolated are aggregated into image blocks equal in size to the image block to be interpolated, and a video information value is assigned to each of these image blocks, for example by low-pass filtering of the video information values of the individual pixels of the image block in question. The image blocks arising in this way form original image regions for performing the methods according to the invention.

In a next step, the resolution of the image block to be interpolated is made smaller by dividing the image block into a plurality of smaller image blocks, which correspond to image regions to be interpolated for the method according to the invention. Similarly, the resolution of the correctly transmitted image blocks surrounding the image block to be interpolated is made larger and the method is again performed for the "smaller" image regions to be interpolated of the image block to be interpolated as a whole.

The iterative processing is repeated until the resolution for the image block to be interpolated reaches the same value as for its surroundings.

These and other objects, features and advantages of the present invention will become more apparent in light of the following detailed description of preferred embodiments thereof, as illustrated in the accompanying drawings.

BRIEF DESCRIPTION OF THE DRAWINGS

FIGS. 4A-4C illustrate an interpolation method with reference to an example for enhancing the resolution of a motion-vector field;

FIG. 18 illustrates in general fashion an interpolation method wherein interpolation is performed spatially or temporally and spatially.

DETAILED DESCRIPTION OF THE INVENTION

Figure 1A:
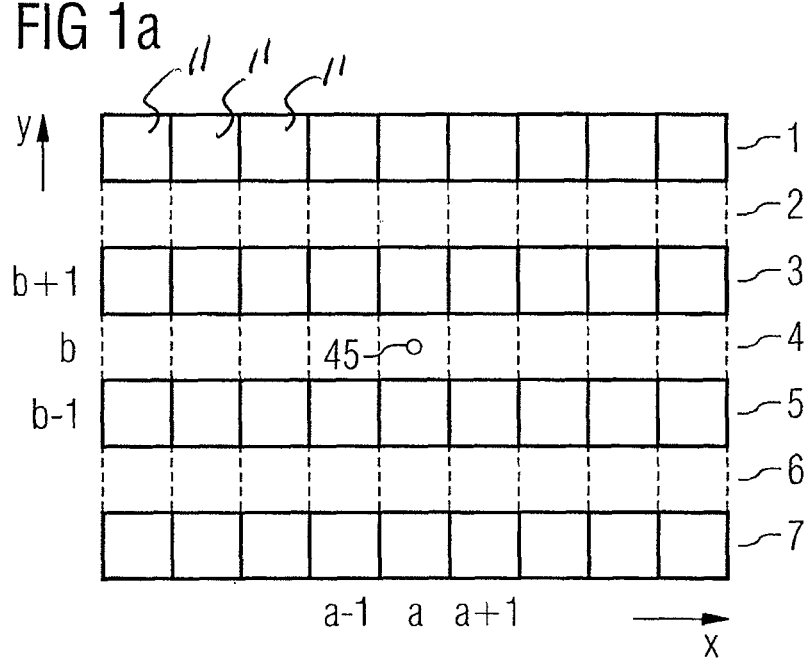
FIGS. 1A-1G illustrate an interpolation method with reference to an example for intermediate-line interpolation.

FIG. 1A depicts schematically an excerpt from an image, which exhibits original image lines 1, 3, 5, 7, which are each divided into a number of pixels 11. These image lines 1, 3, 5, 7 are for example image lines of a field known from television transmission. In order to enhance the image resolution or improve the image representation it is desirable to interpolate between every two original lines 1, 3, 5, 7 a further image line 2, 4, 6, which is referred to as an intermediate line in what follows, each intermediate line comprising a plurality of pixels. The pixels of the original image lines 1, 3, 5, 7 are illustrated in FIG. 1A as squares drawn with solid lines, while the pixels of intermediate lines 2, 4, 6 are illustrated as squares having in part dashed lines.

The original image lines 1, 3, 5, 7 having the original pixels, as well as the intermediate lines 2, 4, 6 to be interpolated having the pixels to be interpolated, are part of an image in which the original pixels and the pixels to be interpolated are arrayed for example in matrix fashion. In this example the original image lines and the intermediate lines 1-7 are disposed one above another in the vertical direction. A first direction of the pixel matrix corresponding to the horizontal direction is referred to as the x-direction in what follows, while a second direction running vertically relative to the first direction is referred to as the y-direction in what follows.

Each of the pixels of this pixel matrix forms an image region in the meaning of the invention, with which a video information value has already been associated if an original pixel is under consideration, or with which a video information value is to be associated by interpolation. This video information value can be a luminance value or a chrominance value.

In the image illustrated in excerpt form in FIG. 1A, which comprises image regions—pixels in the present case—arrayed in matrix fashion, image directions can be defined. The following notation is employed to describe such an image direction:

$$r=(dx,dy). \tag{1}$$

Here r denotes the image direction or a director, and dx and dy denote the components of this image direction or the director in the x-direction and the y-direction. The smallest whole-number numerical values that can be employed to describe the image direction in question will be used for dx and dy in each case. The image direction r=(0,1) for example describes the vertical direction, while r=(1,0) describes the horizontal direction.

Moreover, consider now a pixel 45 of the intermediate line 4, for which the determination of an interpolated video information value will be explained in what follows. This pixel 45 is located at a position (a, b) in the pixel matrix illustrated in FIG. 1A. S(.,.) generally denotes the video information value of a pixel at position (.,.) and indeed both the video information value of an original pixel and the video information value of a pixel to be interpolated.

At the beginning of the method according to an aspect of the invention, a starting interpolation direction is defined and a figure of merit is determined for this starting interpolation direction. This will be explained in what follows with reference to FIG. 1B.

In this example the vertical image direction r=(0, 1) is chosen as starting interpolation direction, any arbitrary further image direction also being eligible for choice as starting interpolation direction. In light, however, of the fact that in the present case the video information values are to be interpolated for pixels that lie in the vertical direction between pixels for which items of video information exist, the horizontal direction r=(1, 0) is less suitable as the starting interpolation direction.

Figure 1B:
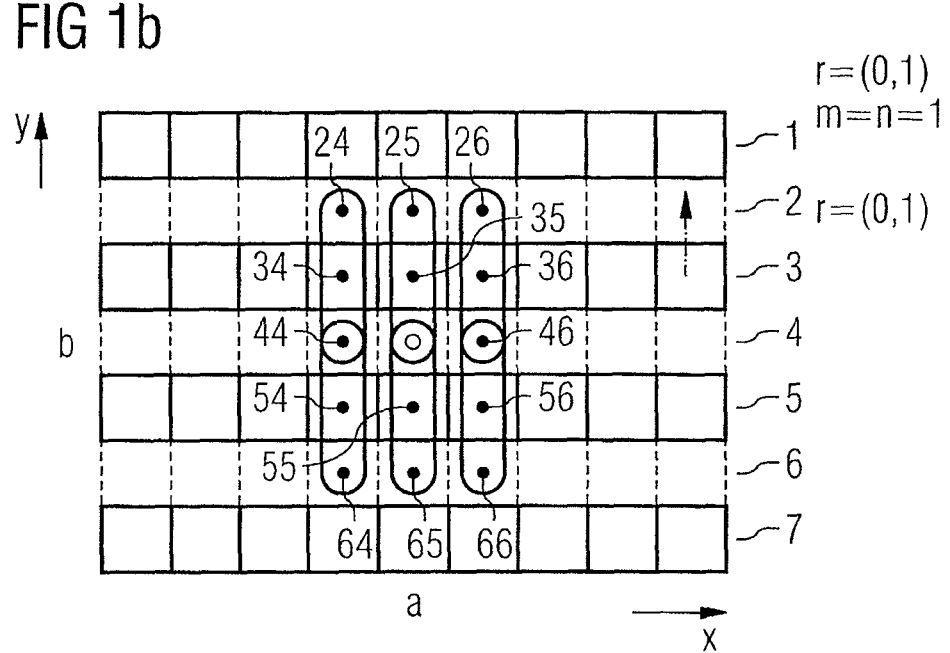

In order to determine a figure of merit for this starting interpolation direction, there is selected at least one group of image regions that lie adjacent one another in this direction and that furthermore are disposed in the region of the image region 45 to be interpolated. In the example of FIG. 1B, six such groups of image regions have been selected. In FIG. 1B these groups are visualized by closed curves drawn with solid lines. The individual pixels contained in each group are symbolized by dots. Each of these groups in the example comprises three pixels adjacent one another in the starting interpolation direction, in the example immediately adjacent one another.

In the example according to FIG. 1B, the individual groups each comprise one original pixel and two pixels to be interpolated. Here the original pixels are pixels 34, 35, 36 and 54, 55, 56, which are disposed in lines 3 and 5 above and below the intermediate line 4 to be interpolated, and of which the pixels 35, 55 occupy the same position in the x-direction as the pixel 45 to be interpolated. Further the pixels 34, 36 and 54, 56 respectively each lie offset by one pixel in the x-direction from the position of the pixel 45 to be interpolated.

The two further pixels of such a group each lie immediately adjacent, in the starting interpolation direction, an original pixel 34-36 or 54-56 respectively, one of the two pixels adjoining the original pixel in question, 34-36 or 54-56 respectively, in a direction corresponding to the starting interpolation direction, and the other of the two pixels in a direction opposite to the starting interpolation direction.

In what follows, there is determined for each of these groups an individual figure of merit, which tells how much the video information values of the pixels of a group lying adjacent one another in the starting interpolation direction deviate from one another. The sum of these individual figures of merit is then employed as a figure of merit for the starting interpolation direction in the region of the pixel 45 to be interpolated.

In the example illustrated in FIG. 1B, the groups of image regions used to determine the figure of merit for the starting interpolation direction are so chosen that two of them contain the pixel 45 to be interpolated and the groups contain further pixels to be interpolated in the intermediate lines 2, 4 and 6, namely the pixels 24-26, 44, 46, 64-66. Before the figure of merit is determined for the starting interpolation direction, starting interpolation values are to be associated with both image region 45 to be interpolated and the further image regions to be interpolated. This is done by generating an interpolation value from the video information values of original pixels lying adjacent, in the starting interpolation direction, the pixel in question to be interpolated. This interpolation can be effected for example by low-pass filtering. Thus starting interpolation value S45=S(a, b) for pixel 45 to be interpolated can be generated by low-pass filtering of pixels 35, 55 immediately adjacent in the starting interpolation direction, so that:

$$S45=S(a,b)=TP[S(a,b+1); S(a,b-1)]. \quad (2)$$

Here TP[.] denotes low-pass filtering of the video information values listed inside the square brackets, which in the simplest case can be averaging.

Starting interpolation values are determined similarly for the remaining video information values 24-26, 44, 46, 64-66 to be interpolated, which are contained in the groups of image regions.

In this connection it should be pointed out once again that the generation of these starting interpolation values for pixel 45 to be interpolated and for further pixels to be interpolated is necessary only when the individual groups to be examined in order to generate a figure of merit for the starting interpolation direction comprise image region 45 to be interpolated and, as applicable, further image regions to be interpolated.

The determination of individual figures of merit comprises for example high-pass filtering. By way of example, consider in what follows the group having pixels 25, 35, 45, which contains pixel 45 to be interpolated. For this group the individual figure of merit in the starting interpolation direction is given by $$M'(0,1)=HP[S25,S35,S45]. \quad (3)$$

Here M'(0, 1) denotes an individual figure of merit for the image direction (0, 1) under consideration, and HP[.] denotes high-pass filtering of the video information values listed inside the square brackets. The filter coefficients of this filter are for example −0.25, 0.5, 0.25, so that by way of example:

$$M'(0,1)=-0.25 \cdot S25+0.5 \cdot S35-0.25 \cdot S45. \quad (4)$$

Here the value of this individual figure of merit is smaller the less the video information values of pixels lying adjacent one another in the starting interpolation direction deviate from one another. For the above-explained numerical example, the individual figure of merit is equal to zero when the video information values of a group of image regions under consideration are all equal in value.

The figure of merit for the starting interpolation direction is determined by adding up the absolute values of the individual figures of merit of the individual groups. The result is $$M(0,1)=\Sigma |M'(0,1)|. \quad (5a)$$

Here Σ stands for the sum of the individual figures of merit of all groups under consideration.

Instead of the absolute values it is also possible to add up the squares or arbitrary other even powers of the individual figures of merit of these individual groups, so that:

$$M(0,1)=\Sigma (M'(0,1))^{2p}. \quad (5b)$$

Here p stands for an arbitrary whole number not equal to zero.

When high-pass filtering is used in order to determine the figure of merit, the value of the figure of merit is smaller the less the video information values of image regions lying adjacent one another in the starting interpolation direction under consideration deviate from one another.

The number of image regions of a group examined in order to determine the figure of merit is of course not limited to just three image regions. It is of course also possible to examine, that is, subject to high-pass filtering, more than three image regions lying adjacent one another in the starting interpolation direction.

Figure 1C:
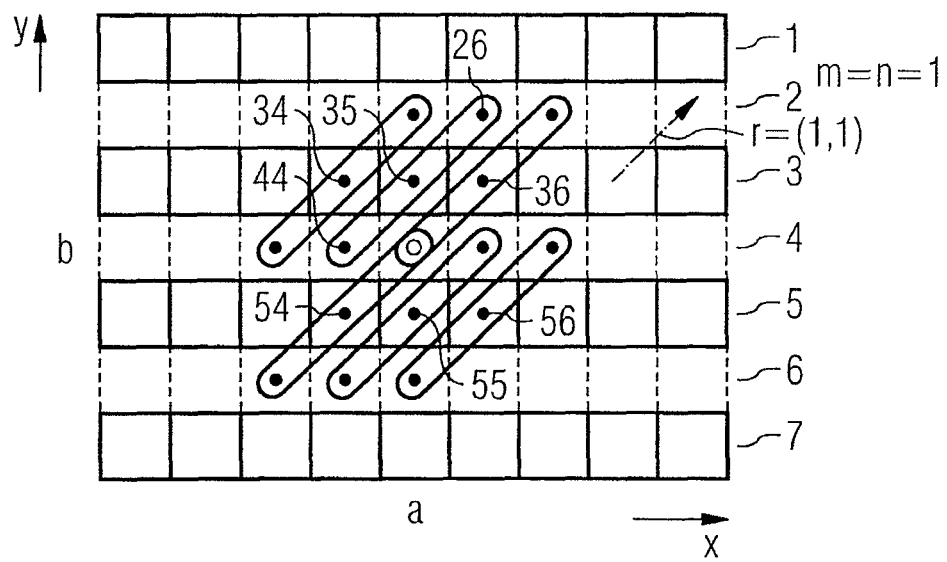

The method according to the invention makes provision for determining a figure of merit for at least one further image direction that deviates from the starting interpolation direction, as is explained in what follows with reference to FIG. 1c. In the example it is assumed that the direction r=(1, 1) is examined as a further image direction. The figure of merit is now determined in dependence on video information values of at least one group of image regions lying adjacent one another in this image direction. In the example according to FIG. 1c, six such groups of image regions are formed, which in the example again comprise respectively the original regions 34-36 and 54-56 disposed around image region 45 to be interpolated. Along with one of original image regions 34-36, 54-56, each of these groups in the example comprises two further image regions lying adjacent the respective original image region 34-36, 54-56 in the image direction r=(1, 1) under consideration. Of these further image regions, one in each case lies adjacent the original image region in question in the image direction r=(1, 1) under consideration, and one opposite to this image direction r=(1, 1). The following notation is employed in what follows to describe a group of image regions each lying adjacent one another in an image direction:

$$[(x,y); r=(dx,dy); m,n].$$

Here (x, y) denotes the coordinates of a pixel of this group. The image direction under consideration is symbolized by r. The number of pixels contained in the group starting from the pixel having coordinates (x, y) in image direction r is denoted by m, while n stands for the number of image regions contained in the group starting from the image region having coordinates (x, y) opposite to image direction r, so that $$[(x,y); r; m,n]=[(x,y); (x+i \cdot dx, y+i \cdot dy) \text{ for } i=1, \ldots, m; (x-j \cdot dx, y-j \cdot dy) \text{ for } j=1, \ldots, n]. \quad (6)$$

For example, [(a, b+1); r=(1, 1); 1, 1] yields the group of image regions having the original image region 35, which has coordinates (a, b+1), and having the two pixels 26, 44 with coordinates (a, b+2) and (a−1, b), which lie adjacent to the original image region 35 in direction r=(1, 1).

It should be pointed out that the parameters m, n governing the number of pixels of a group can be chosen almost arbitrarily, the number of image regions of a group under consideration increasing with the parameters m, n.

With the nomenclature introduced above, the figure of merit for a group of image regions can be expressed as:

$$M'(r)=HP[S(x,y); r; m,n]. \quad (7)$$

Here again HP[.] denotes a high-pass function whose filter parameters are to be adapted to the number of video information values S(.) to be filtered.

The figure of merit of an image direction under consideration is then given by:

$$M(r)=\Sigma M'(r). \quad (8)$$

Figure 1D:
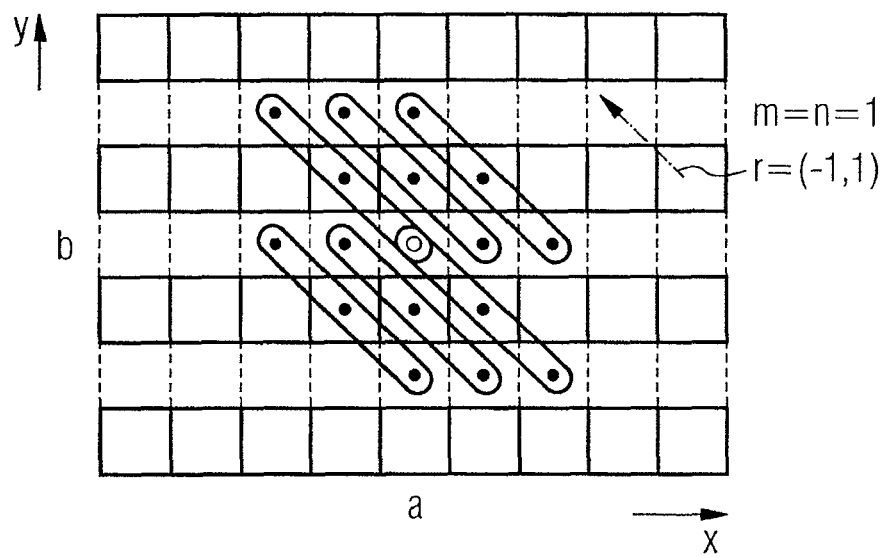

With reference to FIG. 1D, the figure of merit is preferably determined for a further image direction that is symmetrical to the further image direction r=(1, 1) relative to the starting interpolation direction established at the beginning of the method—in the above-explained example r=(0, 1). FIG. 1D depicts six groups of image regions that again comprise original pixels 34-36 and 54-56 and comprise in each case three pixels lying adjacent one another in image direction r=(−1, 1).

The image direction r=(−1, 1) is symmetrical to the above-considered image direction r=(1, 1) relative to the starting interpolation direction r=(0, 1).

The quality value determined for this further image direction r=(−1, 1) is symbolized by M(−1, 1) in what follows.

In a next step, provision is made for comparing the figures of merit of the image directions considered up to this point, that is, the starting interpolation direction r=(0, 1) and the two further image directions r=(1, 1) and r=(−1, 1), in order to determine in each case the "best image direction." Here the best image direction is the image direction whose figure of merit indicates the smallest deviation of pixels lying adjacent one another. The image direction for which the smallest figure of merit was determined is then selected as the interpolation direction and a video information value is interpolated for the image region 45 to be interpolated, using those image regions that lie adjacent one another in the interpolation direction.

In what follows, ri denotes the interpolation direction determined by comparing the figures of merit. For the above-explained example, in which the direction r=(0, 1) was the starting interpolation direction and the directions r=(1, 1) and r=(−1, 1) were further image directions, the following holds for this interpolation direction:

$$ri=[\min(M(0,1), M(1,1), M(-1,1))]^{-1}. \quad (9)$$

Here min(.) denotes a minimum function that determines the minimum of the values listed inside the parentheses. The expression $[.]^{-1}$ symbolizes a function that, for a given figure of merit, leads back to the direction for which this figure of merit was determined.

Figure 1E:
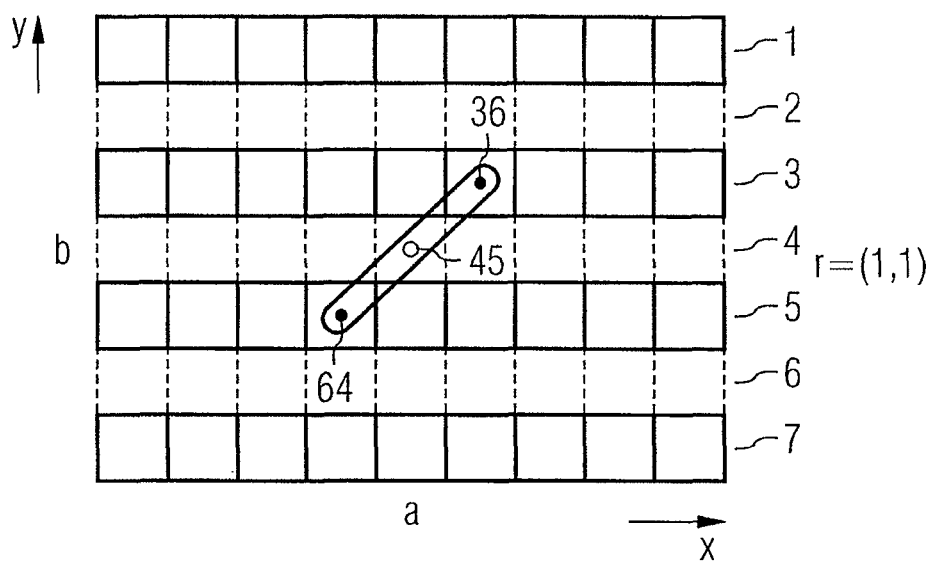

The interpolated video information value is generated for example by low-pass filtering of video information values of those image regions that lie adjacent to the pixel 45 to be interpolated in interpolation direction ri. Under the assumption that direction r=(1, 1) was determined as interpolation direction ri, the interpolated video information value S45=S(a, b) can be interpolated for example by low-pass filtering of the pixels 36, 64 lying adjacent in the direction r=(1, 1), as is illustrated in FIG. 1E.

In general the interpolation value is given by:

$$S(a,b)=LP[S(a,b); r=ri; m,n]. \quad (10)$$

The image regions subjected to low-pass filtering in order to determine the interpolated video information value S(a, b) are preferably limited to video information values of original image regions; that is, the group of image regions [(a, b); r=ri; m, n] is selected under the constraint that only video information values of original image regions are elements of this group.

After the interpolation value S45 has been determined, at least one further iteration is performed, in which the figure of merit is determined for at least one further image direction. This further image direction is preferably chosen so that the angle between this further image direction and the starting interpolation direction r=(0, 1) specified at the beginning of the method is greater than the angle between this starting interpolation direction and the image direction r=(1, 1) examined in the preceding iteration.

Figure 1F:
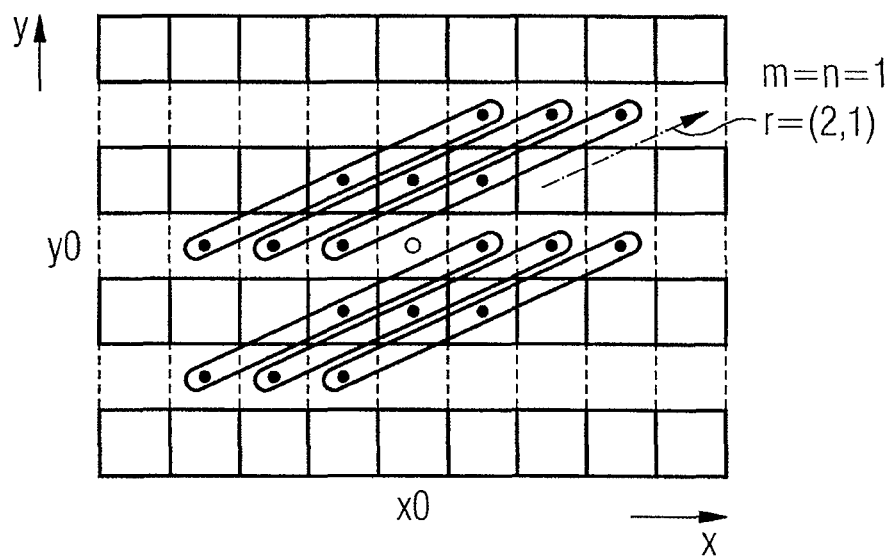

With reference to FIG. 1F, for example, the image direction r=(2, 1) is examined as further image direction. FIG. 1f depicts six groups of pixels, each again comprising the original pixels 34-36 and 54-56. Along with one of these original pixels, each group comprises two further pixels that lie adjacent the original pixel in question in the image direction under consideration. The pixel 45 to be interpolated in this example is an element of one of the groups of image regions examined in order to determine the figure of merit for the direction r=(2, 1). These groups of image regions further comprise further image regions to be interpolated, so that interpolation values are to be associated with these image regions to be interpolated before the figure of merit is determined for this direction r=(2, 1). This is done by performing for each of these image regions the steps explained above for the image region 45; that is, the figure of merit is determined for the starting interpolation direction and at least one further image direction in the vicinity of each of these further image regions to be interpolated, and a video information value is interpolated for the image region in question, using video information values of those image regions lying adjacent one another in the "best image direction."

Figure 1G:
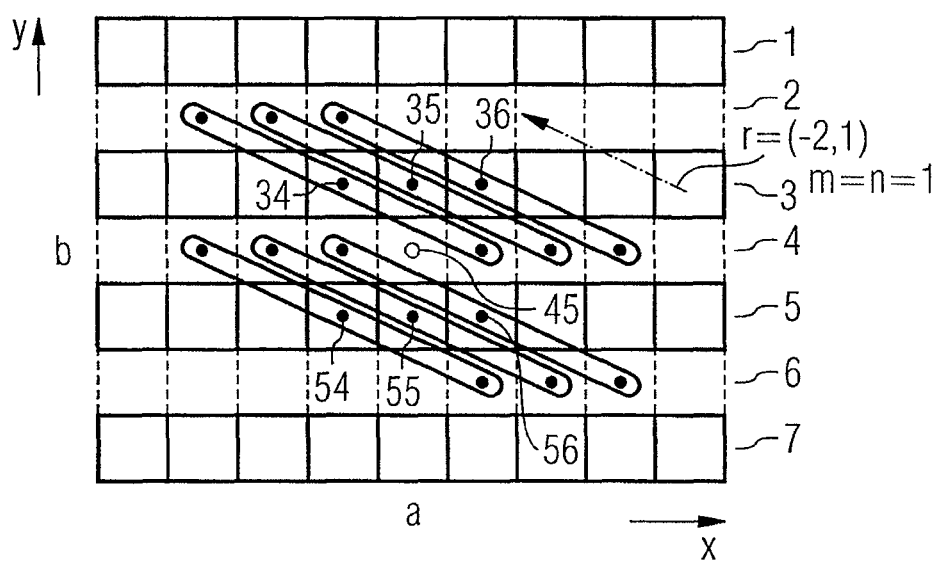

With the groups illustrated in FIG. 1F, a figure of merit M(2, 1) is determined for the image direction r=(2, 1). With reference to FIG. 1G, a figure of merit is determined for the direction r=(−2, 1) lying symmetrically to the direction r=(2, 1), using further groups of image regions.

The minimum of these two figures of merit M(2, 1) and M(−2, 1) and of the figure of merit M(1, 1) of the interpolation direction from the preceding iteration, which forms the starting interpolation direction for performing the current iteration, is determined next in order to determine a "new" interpolation direction. If this interpolation direction deviates from the previous interpolation direction, a new interpolation value is determined for the image region 45 to be interpolated, the video information values used for this purpose being those of image regions lying adjacent one another in the new interpolation direction.

These above-explained iterations, in each of which the figure of merit for a previous best interpolation direction is compared with the figure of merit for at least one further image direction, can be repeated until an end condition has been attained. This end condition can be attained for example when the figure of merit of the interpolation direction becomes less than a specified minimum value or when a specified maximum number of iterations has been reached.

If determining the figure of merit of an image direction requires the video information values of further intermediate regions to be interpolated, the performance of a k-th iteration for the image region to be interpolated is to be preceded by iteration k−1 for the further image region to be interpolated, where k is an arbitrary whole number greater than two. If the individual iterations are performed for a plurality of image regions in parallel, then like image directions are preferably examined in like iterations, that is, in iterations of the same number. In the k-th iteration for example, for all image regions to be interpolated, the figure of merit for the same further image direction is compared with the figure of merit for the starting interpolation direction.

In what follows, the essential steps of the method according to aspects of the invention are again explained with reference to the flow chart of FIG. 2.

In a first step 101 an image direction ri is specified as first interpolation direction or starting interpolation direction. Optionally, in a second step 102, a first interpolation value S(a, b) for the image region to be interpolated is generated by interpolation in this starting interpolation direction ri. This interpolation is necessary if the image region to be interpolated is needed in the subsequent determination of figures of merit.

In a next step 103, a figure of merit for the interpolation direction ri is determined on the basis of image regions in the vicinity of the image region (a, b) to be interpolated.

In a next step 104, at least one further image direction r that is distinct from the interpolation direction ri is selected, and a figure of merit is determined for this further image direction r.

Next, in a step 105, the "best" image direction from the group of the interpolation direction and the at least one image direction is determined by comparing the figures of merit, and the "best" of these image directions is taken over as the interpolation direction ri.

Next, in a step 106, an interpolation value for the image region to be interpolated is generated by interpolating the video information values of those image regions that lie adjacent one another in the interpolation direction. If the image should contain further image regions to be interpolated along with the one image region to be interpolated, only those image regions that are original image regions are preferably used for interpolation in this step.

Next a test is done to determine whether an end condition has been attained, which can be attained for example if the "best" figure of merit has become less than a specified minimum value.

If the end condition has not been attained, steps 104-106 are performed again. In step 104 the further image direction r, which is distinct from the interpolation direction ri, is preferably chosen in a consideration extending over all iterations in such fashion that a new image direction is always employed in each iteration. Moreover, this image direction chosen in step 104 in addition to the interpolation direction ri is preferably so chosen that an angle between the original interpolation direction chosen in step 101 and the further considered image direction r becomes larger from iteration to iteration.

In step 103, if determining the figure of merit M(ri) requires the video information values of at least one further image region to be interpolated, which is distinct from the image region having position (a, b) to be interpolated, then step 102 is applied to this at least one further image region; that is, a video information value for this further image region is interpolated in the starting interpolation direction.

Accordingly, before every repeated performance of steps 104 to 106 for the image region (a, b) to be interpolated, these steps 104 to 106 are performed for every further image region to be interpolated that is contained in a group of image regions that are examined when the figures of merit M(r), M(ri) are determined.

With reference to FIG. 3, the method according to aspects of the invention is also suitable for interpolating more than one intermediate line between two original image lines. Such an interpolation of more than one intermediate line is necessary for example in order to enlarge or scale a specified image. The method explained in what follows for interpolating a plurality of intermediate lines is additionally performed in a column direction; that is, an appropriate number of "image columns" is interpolated.

Figure 3A:
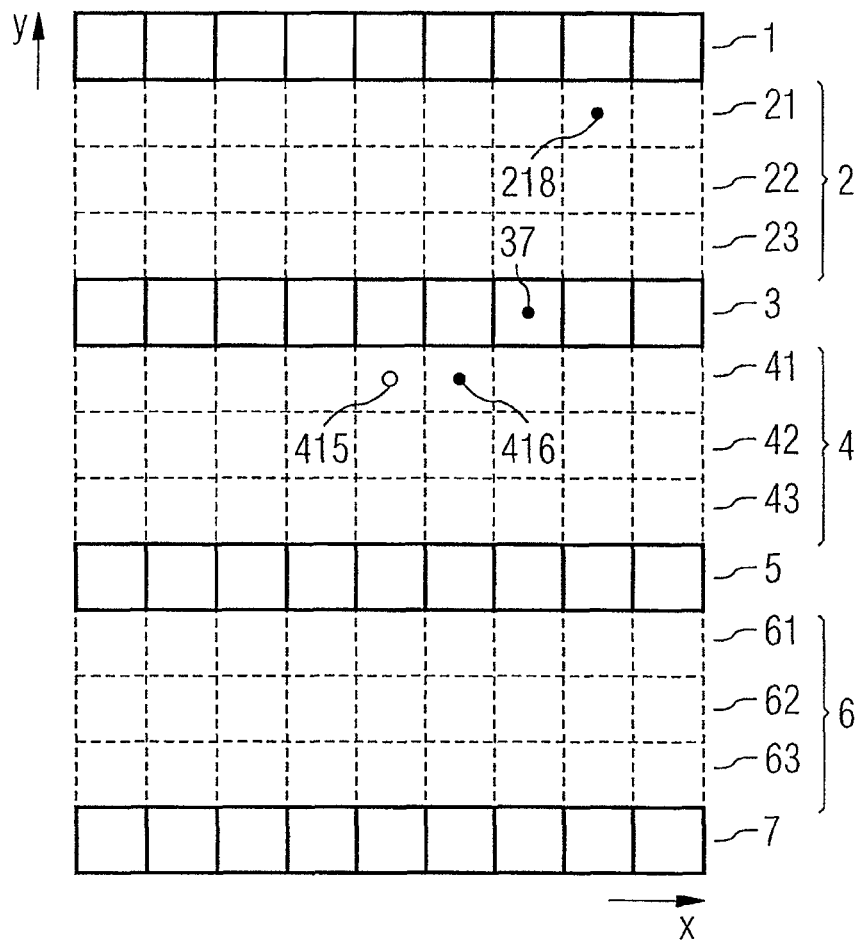
FIGS. 3A-3B illustrate an interpolation method with reference to an example for intermediate-line interpolation, there being more than one intermediate line to be interpolated.

FIG. 3A depicts in excerpt from an image having the three original image lines 1, 3, 5, 7, between which in each case more than one, in the example three, intermediate lines 21-23, 41-43, 61-63 are to be interpolated.

For the sake of explanation, consider a pixel 415 of the intermediate line 41 to be interpolated. The interpolation of this pixel is done in correspondence with the interpolation of the pixel 45 as explained in FIG. 1 with the following further aspects taken into consideration:

Both in generating an interpolation value of this image region 415 and in determining figures of merit for image directions in the vicinity of this image region 415 to be interpolated, the only video information values used are those of original image regions or those of image regions that occupy the same relative position relative to the original image lines as does the image region 415 to be interpolated. If rank-sequence numbers are always associated in the same way with the intermediate lines lying between two original image lines, then the only image regions considered in the interpolation of the image region 415 are the image regions of lines holding the same rank-sequence number as does the line 41 of the image region 415. In other words, in the interpolation of the image region 415, which immediately adjoins an original image line in the direction opposite the y-direction, the only image regions that may be used aside from original image regions are those that also immediately adjoin an original image line in the direction opposite the y-direction. Thus in order to interpolate an image region it can be imagined that the image region is reduced to an image illustrated in FIG. 3B, which exhibits alternately one original image line and one intermediate line, each of the intermediate lines having the same rank-sequence number.

The method of intermediate-line interpolation, already explained with reference to FIG. 1, can be applied to this reduced image illustrated in FIG. 3B, the position of an image region to be interpolated relative to the original image regions necessarily being taken into account both in low-pass filtering to generate an interpolated video information value and also in high-pass filtering. In low-pass filtering to generate the interpolated video information value, a greater weight is accorded to the video information value of the image region that lies nearer the image region to be interpolated. This is explained in what follows with reference to FIG. 3b.

Figure 3B:
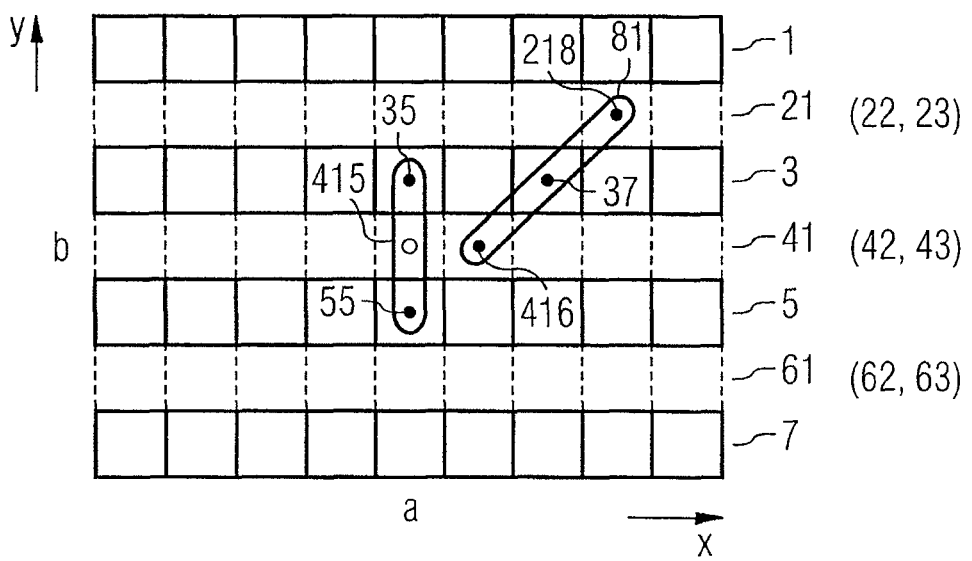

The reference character 81 in FIG. 3B identifies a group of image regions lying adjacent one another in the direction r=(1, 1) in the reduced image. This group of image regions comprises the original pixel 37 of original image line 3, as well as a pixel 416 to be interpolated in the image line 41 to be interpolated and the pixel 218 to be interpolated in the image line 21 to be interpolated. These pixels are likewise drawn with corresponding reference characters in FIG. 3A. In order to determine a partial figure of merit M' for this group 81, the video information values of the image regions of this group are subjected to high-pass filtering, the applied high-pass filtering being so chosen that of the image regions 416, 218 to be interpolated, a greater weight is accorded the video information value of the image region lying nearer the original image region 37. The video information values of the image regions to be interpolated can in particular receive weights proportional to their distance from the image line of the original image region 37.

If it is taken into consideration that the image region 416 is only one line away from the image region 37, while the image region 218 is three lines away from the image region 37, the weight accorded the video information value of the image region 416 might be three times as large as that of the video information value of the image region 218. The figure of merit M' for the group 81 may be determined as follows:

$$M'_{81}(1,1) = \tfrac{1}{8} \cdot [-1 \cdot S218 + 4 \cdot S37 - 3 \cdot S416]. \quad (11)$$

The coefficients of such a high-pass filtering are thus $-\tfrac{1}{8}$, $\tfrac{1}{2}$, $-\tfrac{3}{8}$.

In general the condition for such high-pass filtering would be:

$$M'_{81}(1,1) = (-c \cdot S218 + (c+d) \cdot S37 - d \cdot S416). \quad (12)$$

Here c denotes the distance between the line having the image region 416 and the line having the image region 37, while d denotes the distance between the line having the image region 218 and the line having the image region 37.

The determination of an interpolated video information value taking into consideration the video information values of adjacent original image regions is carried out in corresponding fashion with weighting. Thus a greater weight is accorded the video information value of the original image region that lies nearer the image region to be interpolated. If for example the video information value S415 of the image region 415 to be interpolated is to be interpolated in the vertical direction r=(0, 1) using the video information values S35, S55 of the original image lines 3, 5, then a greater weight is accorded to the video information value S35 of the image line 3 that lies nearer the image region 415 to be interpolated. A possible function for generating the interpolated video information value S415 is:

$$S415 = 0.25 \cdot (3 \cdot S35 + S55). \quad (13)$$

The method according to aspects of the invention, previously explained for the interpolation of intermediate-line pixels with reference to the Drawings, is not limited to limit this application. Instead, the method according to aspects of the invention is suitable for interpolating arbitrary video information values associated with individual image regions arrayed in matrix fashion in an image. The method is also suitable for enhancing the resolution of a motion-vector field, as will be explained in what follows with reference to FIGS. 4A-4C.

Figure 4A:
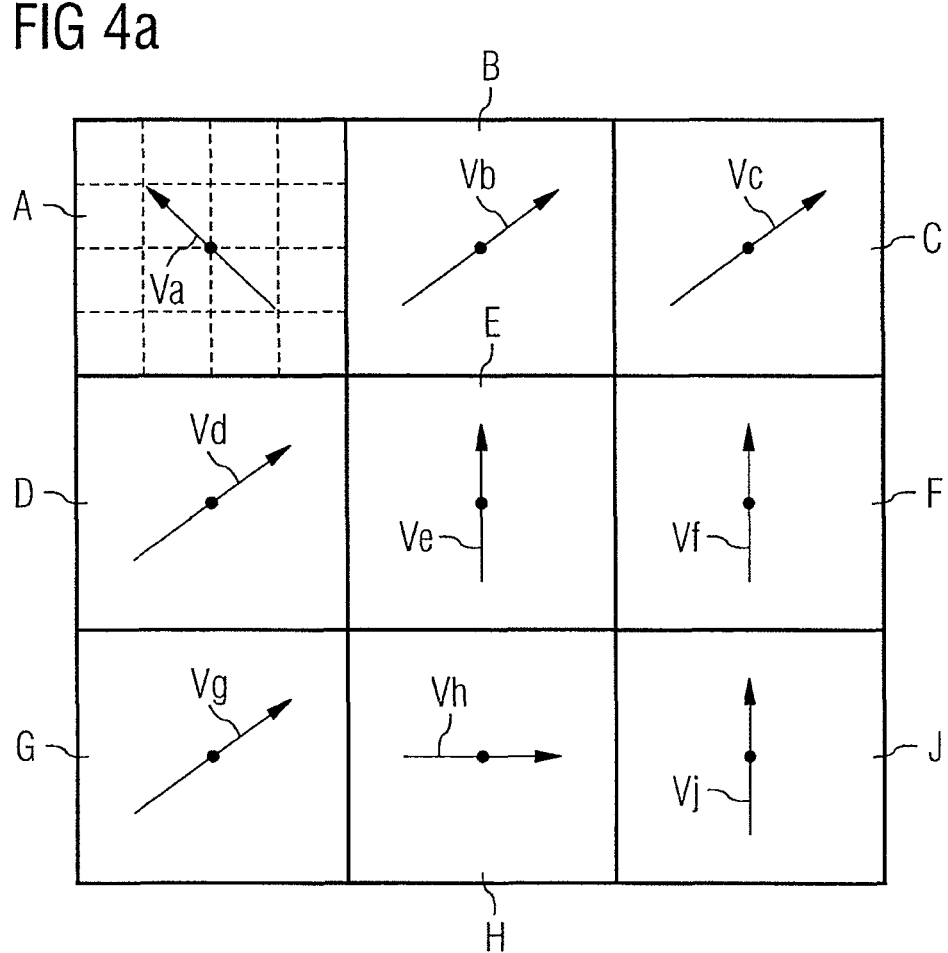

FIG. 4A depicts in excerpt form an image that is divided into a number of image blocks A-J with each of which a motion vector Va-Vj is associated. Each of these image blocks exhibits a number of pixels arrayed in matrix fashion, as is illustrated by squares drawn with dashed lines in image block A in FIG. 4A. Methods for determining motion vectors associated with individual image blocks of an image are well known, so that no further exposition on this point is necessary.

Motion vectors are needed so that motion processes can be represented in motion-correct fashion when intermediate images are interpolated between two successive images of an image sequence. For the most exact possible representation of such motion processes it is desirable to obtain the highest possible resolution of the motion-vector field, that is, to obtain the smallest possible image blocks each having its own associated motion vector.

With reference to FIG. 4B, in order to enhance the resolution of the motion-vector field, provision is made for refining the block grid of FIG. 4A, which will be referred to as first block grid in what follows. Here the image is divided into a second block grid that comprises a group of first blocks A1-J1 each of which is completely contained in the original image blocks A-J of the first grid. The image is initially divided in only one direction, the vertical direction in the example, which again is referred to as the y-direction. The blocks initially retain their original width in the horizontal direction. The division into the smaller image blocks of the second block grid yields a group of second image blocks AD-FJ each of which lies between two first image blocks A1-J1 and each of which overlaps two adjacent blocks of the first block grid. Preferably each of the image blocks of the second block grid illustrated in FIG. 4B is equal in size and comprises a number of pixels, which are illustrated as squares drawn with dashed lines in image block A1.

The number of pixels of a block of the second block grid in the example is reduced by a factor of two relative to the number of pixels of a block of the first block grid, so that the resolution of the vector field is enhanced by a factor of two.

Associated with each of the first image blocks A1-J1 of the second block grid is the motion vector of the image block of the first grid from which it originated. These first image blocks A1-J1 form the original image regions for performing the method according to aspects of the invention. The second image blocks AD-FJ of the second grid, lying between every two such image blocks A1-J1 in the vertical direction, form image regions to be interpolated for performing the method according to the invention. Video information values to be interpolated for these image regions AD-FJ to be interpolated are motion vectors, each motion vector comprising two motion-vector components, an x-component and a y-component. In order to interpolate a motion vector for an image region AD-FJ to be interpolated, the method according to the invention is thus to be performed twice, once for the x-component of the motion vector and once for the y-component of the motion vector. The motion vectors Va-Vj of the original image regions are to be resolved into their motion-vector components here, only the x-components of the motion vectors of the original image areas being taken into account in a first performance of the method, wherein for example the x-components of the motion vectors of image regions to be interpolated are determined, and only the y-components of the motion vectors of the original image regions being taken into account in interpolating the y-components of the motion vectors of the image regions to be interpolated.

In FIG. 4B the interpolated motion vectors for the image regions Ad-Fj to be interpolated, which are available after the completion of the iterative interpolation method, are drawn with dashed lines.

Figure 4C:
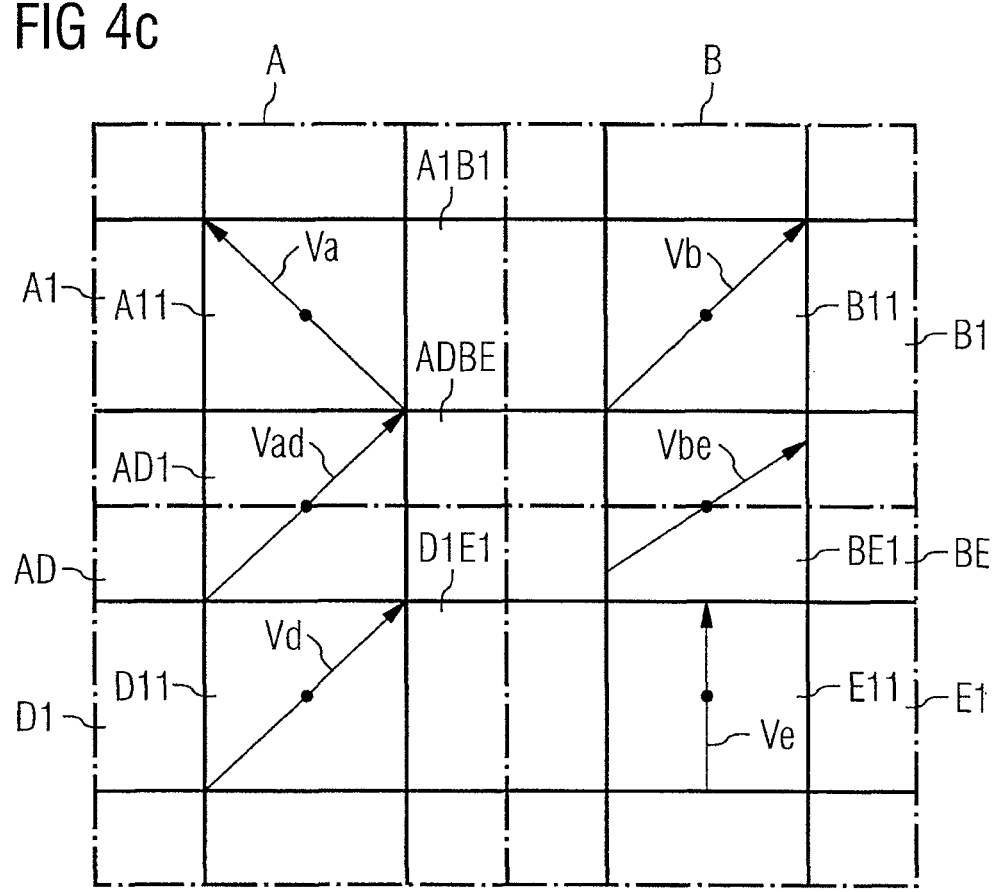

In a next step, with reference to FIG. 4C, a further resolution of the motion-vector field can be attained by dividing the blocks of the second block grid in the horizontal direction into smaller blocks, as is illustrated in FIG. 4C for blocks A1, B1, AD, BE, D1, E1. These smaller blocks form a third block grid. This third block grid comprises image blocks each of which is completely contained in an image block of the second grid and with each of which the motion vectors of these image blocks of the second block grid are associated. Further, the division into the third block grid produces intermediate blocks, each of which is formed by two blocks of the second block grid lying adjacent one another in the horizontal direction. These image blocks are identified in FIG. 4C with the reference characters A1B1, ADBE, D1E1. The blocks that are completely formed by the blocks of the second grid are identified in FIG. 4C with the reference characters A11, B11, AD1, BE1, D11, E11. These last-named image blocks form original image regions for performing the method according to the invention, while the image blocks A1B1, ADBE, D1E1 form image regions to be interpolated.

The method according to aspects of the invention for interpolating motion vectors is performed for these image regions to be interpolated, the method being performed twice, once for interpolating the x-components of the motion vectors and once for interpolating the y-components of the motion vectors.

The above-explained steps can be repeated until a division has been attained wherein every block of the block grid comprises only one pixel, with which a motion vector is then associated.

The method according to aspects of the invention for interpolating video information values associated with image regions of an image is also suitable for interpolating one or a plurality of video information values for an image block that comprises a plurality of pixels arrayed in matrix fashion, for which image block—for example because of data transmission with errors—no video information values or incorrect video information values exist. The application of the method according to aspects of the invention to the interpolation of video information values for such an image block is explained in what follows with reference to FIGS. 5A-5B.

Figure 5A:
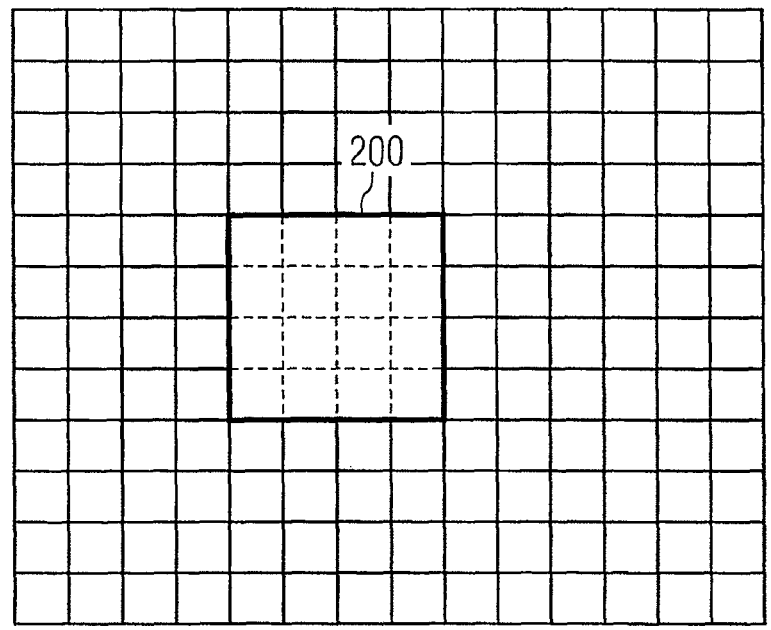
FIGS. 5A-5B illustrate an interpolation method with reference to an example for interpolating an image block not transmitted or not correctly transmitted and comprising a plurality of pixels, during first steps.

FIG. 5A depicts in excerpt form an image that comprises a multiplicity of pixels arrayed in matrix fashion, which are illustrated as squares. Image block 200 comprises a number of pixels arrayed in matrix fashion, in the example 4×4 pixels, for which there are no video information values or incorrect video information values.

Figure 5B:
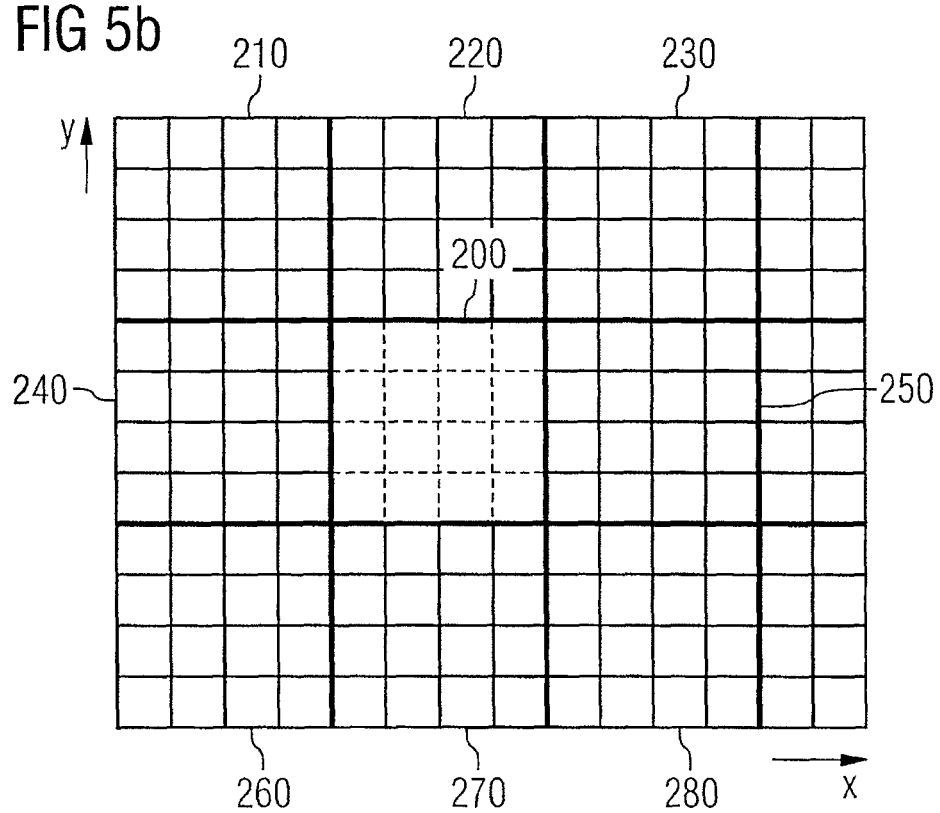

With the method according to aspects of the invention, a single video information value is initially interpolated for the image block 200, which video information value is assigned to all pixels of this image block. With reference to FIG. 5B, the pixels of the image in the vicinity of image block 200 to be interpolated are aggregated into image blocks 210-280, which are equal in size to image block 200 to be interpolated, that is, 4×4 pixels.

A video information value is assigned to each of these image blocks 210, 220, 230, 240, 250, 260, 270 and 280, for example by low-pass filtering of the video information values of the individual pixels of these blocks. These image blocks 210, 220, 230, 240, 250, 260, 270 and 280 with the video information value assigned to them form original image regions for performing the method according to the invention. The image block 200 to be interpolated forms an image region to be interpolated for performing the method according to aspects of the invention.

The above-explained iterative interpolation method is performed, using the original image regions 210, 220, 230, 240, 250, 260, 270 and 280 with the video information values assigned to them, in order to interpolate a video information value for the image block 200 to be interpolated.

The resolution of the image block to be interpolated is then enhanced to assign video information values to the individual pixels of this image block in progressive fashion. There are a variety of options for this purpose, which are explained in what follows with reference to FIGS. 6A-6C and 7A-7D.

Figure 6A:
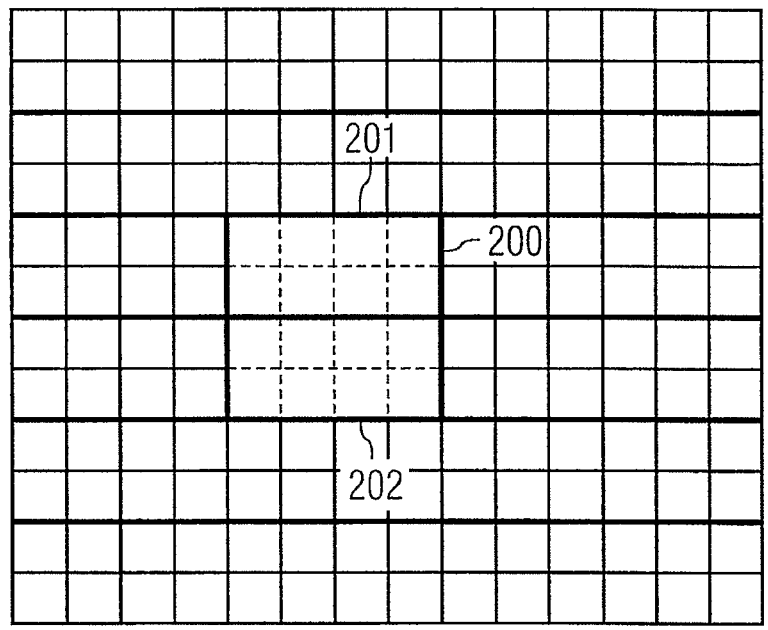
FIGS. 6A-6C illustrate further steps for interpolating an image block comprising a plurality of pixels for a first method.
Figure 6B:
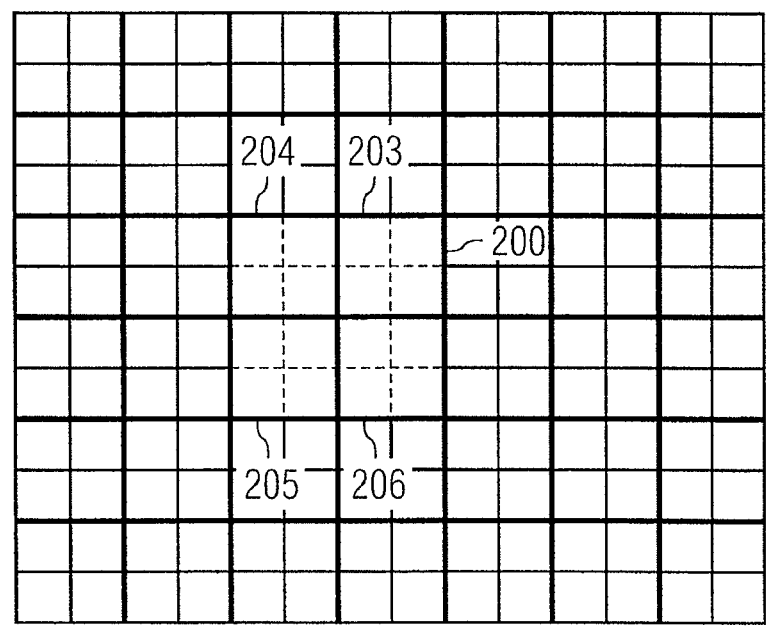
Figure 6C:
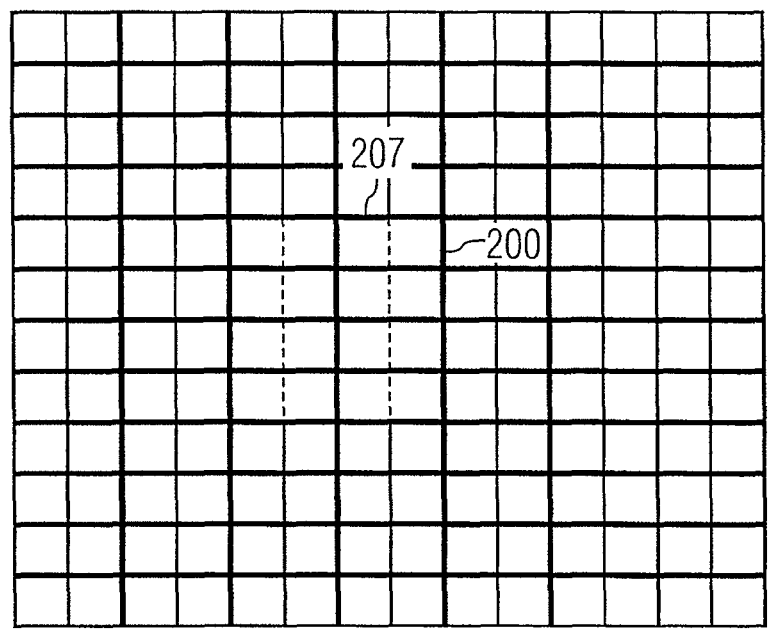

In a first alternative for enhancing the resolution, with reference to FIG. 6A, provision is made for dividing the block 200 in one direction, the vertical direction in the example, into equal-sized sub-blocks, to which the video information value of the image block 200 is initially assigned as starting interpolation value. The pixels in the vicinity of the image block to be interpolated are aggregated into equal-sized image blocks. To each of the resulting adjacent image blocks there is assigned a video information value formed for example by filtering, in particular low-pass filtering, of the video information values of the individual pixels of these blocks. These adjacent image blocks form original image regions for performing the interpolation method according to aspects of the invention.

The above-explained iterative interpolation technique is next applied to each of the two blocks 201, 202 in order to associate a video information value with each of these blocks. In interpolating the video information value of one of the blocks it is possible to leave out of consideration the other image block to be interpolated, as was already explained for the scaling operation with reference to FIGS. 3A-3B. In application to the situation illustrated in FIG. 6A this means that in interpolating the video information value of one of the image blocks 201, 202, only the video information values of original image blocks are taken into consideration, weights being accorded these video information values in correspondence with how far away they are from the image block to be interpolated.

In interpolating the video information value for one of the blocks 201, 202, it is furthermore possible to treat the other of the two blocks as original image block and to take this other of the two blocks into consideration in the interpolation. The video information value of this other image block corresponds here to the above-determined video information value for the block 200. The performance of the interpolation method then corresponds to the intermediate-line interpolation method, with the difference that in the situation according to FIG. 6A, image regions to be interpolated do not recur regularly in the image.

In a next step, the resolution of the block is further enhanced by a factor of two by dividing the block 200 in the horizontal direction so that the four image blocks 203, 204, 205, 206 are produced. The method for interpolating video information values, explained above for the blocks 201, 202, is next applied to these four image blocks. The starting interpolation values of these image blocks 202-206 produced by dividing the blocks 201, 202 correspond to the above-interpolated video information value of the block from which they originated by division.

In order to perform the interpolation method, the pixels in the vicinity of the image blocks 203-206 to be interpolated are aggregated into image blocks equal in size to the image blocks 203-206 to be interpolated. These image blocks form original image regions for performing the iterative interpolation method.

While the vertical direction is preferably chosen as starting interpolation direction for the interpolating image blocks 201, 202 in accordance with FIG. 6A, the method for interpolating the smaller image blocks 203-206 preferably begins with the horizontal direction as starting interpolation direction. In general, when a video information value is interpolated for a sub-block of an image block, the preferred starting interpolation direction is the direction in which the image block was divided in order to generate the sub-block.

With reference to FIG. 6C, the resolution is again enhanced by a factor of two by dividing the blocks 203-206 in the vertical direction into equal-sized sub-blocks, one of which is identified by the reference character 207 in FIG. 6C. The iterative interpolation method is then applied to each of these sub-blocks 207, the individual blocks 207 each being assigned, as starting interpolation value, the video information value of that one of the blocks 202-206 from which the sub-block in question originated. In order to perform the interpolation method, the pixels in the surroundings of the entire image block 200 to be interpolated are aggregated—as in the methods explained with reference to FIGS. 6A and 6B—into image blocks equal in size to the sub-blocks to be interpolated.

After a video information value has been assigned to the individual image blocks 207 by the iterative technique, these image blocks are further divided in the horizontal direction, pixel-wise resolution being attained in the example wherein the image block to be interpolated comprises 4×4 pixels. The iterative interpolation method is then applied to these individual pixels to associate a video information value with each individual pixel. The above-determined video information values of the image blocks 207 from which they originated are employed as starting interpolation values for the individual pixels.

In the method explained above with reference to FIGS. 6A-6C, the resolution of the image block to be interpolated is successively enhanced by progressively dividing the block in alternately the vertical direction and the horizontal direction.

In what follows, with reference to FIGS. 7A-7D, a method is explained wherein the resolution of the block is enhanced starting from the margins of the block.

Figure 7A:
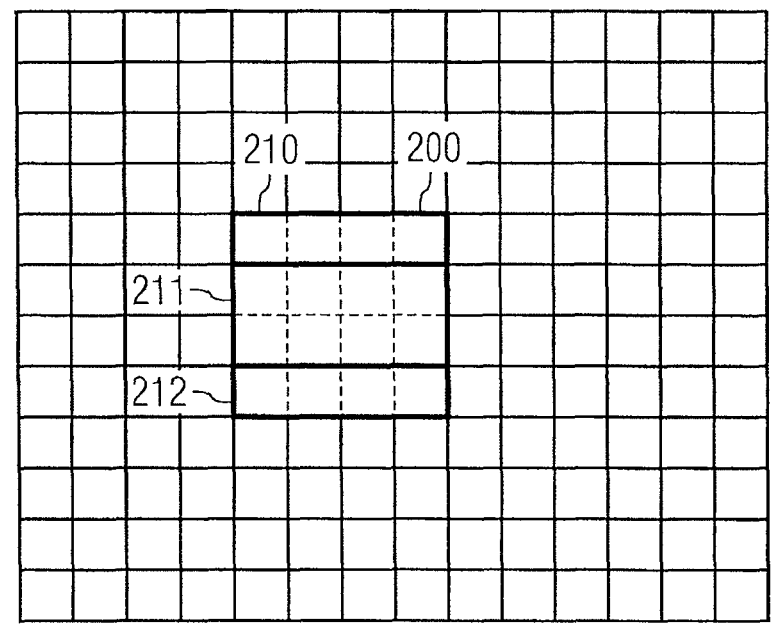
FIGS. 7A-7D illustrate further steps for interpolating an image block comprising a plurality of pixels for a second method.

With reference to FIG. 7A, the image block to be interpolated is divided in one direction, the vertical direction in the example, into three image blocks, first, second and third image blocks 210, 211, 212. The "width" of the first and third image blocks in the vertical direction here is just one pixel; a width of these blocks 210, 212 in the horizontal direction is four pixels in the example. The iterative interpolation method is next employed to interpolate a video information value for each of the pixels of the first and third image blocks. The pixels of "middle" image block 211 are treated here as original pixels with which the above-determined video information value of the image block 200 is associated.

Figure 7B:
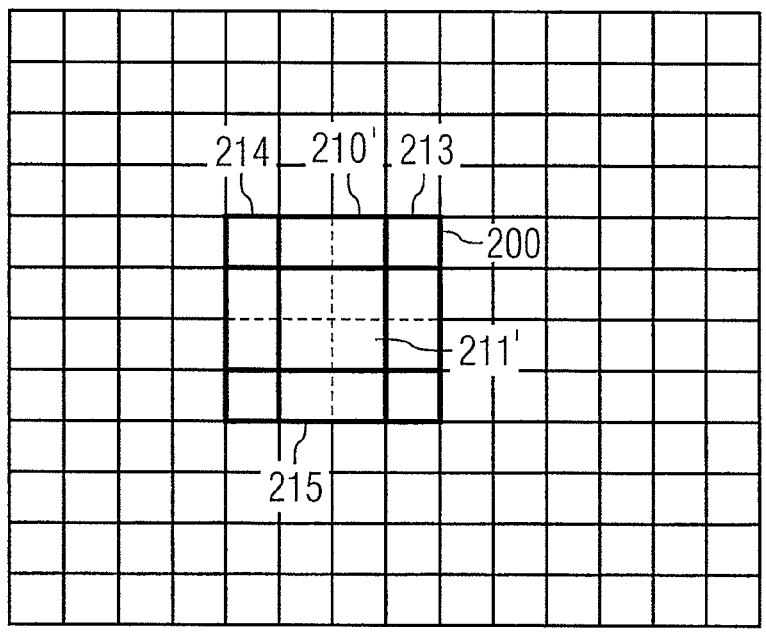

With reference to FIG. 7B, the resolution of the image block is next enhanced in the horizontal direction by further dividing the image block in this horizontal direction to form fourth and fifth image blocks 213, 214, each of which is one pixel wide in the horizontal direction and four pixels wide in the vertical direction. In this way smaller image blocks 210', 211', 212' are produced from the first, second and third image blocks. A video information value for each of these pixels of these fourth and fifth image blocks is next determined, using the iterative interpolation method according to the invention. The remaining pixels of the image block, that is, the pixels of the smaller image blocks 210', 211', 212', are here treated as original pixels to which the interpolated video information values of the first, second and third image blocks are assigned.

After these steps have been performed, a resolution at the pixel level has been attained for the image blocks 210, 212, 213, 214, while the central image block 211' having 2×2 pixels, to which only one video information value is assigned, still has a lower resolution. This central image block 211' is treated in what follows as was the original block 200, by enhancing its resolution in the horizontal direction and the vertical direction in "one-pixel steps" starting from the margins.

Figure 7C:
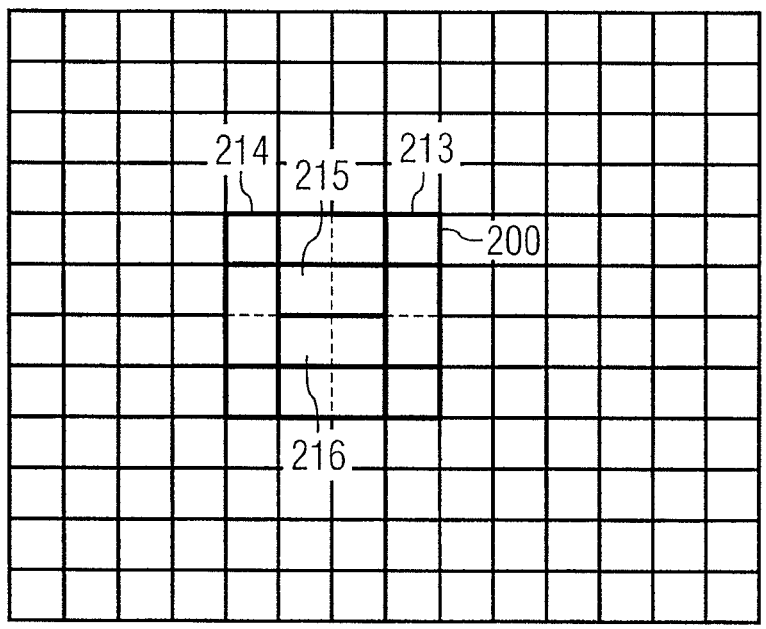

For this purpose, with reference to FIG. 7C, the central image block is first divided further in the vertical direction so that the image blocks 215, 216, each two pixels wide and one pixel high, are produced. The iterative method according to aspects of the invention is next applied to assign a video information value to each pixel of these image blocks 215, 216.

It is optionally possible to proceed in the horizontal direction with the division into blocks four pixels wide and one pixel high and to apply the iterative interpolation method to associate a video information value with each of the pixels of these blocks. In this case, a new video information value is interpolated for the pixels of the blocks 213, 214 adjacent the central region 211' in the horizontal direction.

Figure 7D:
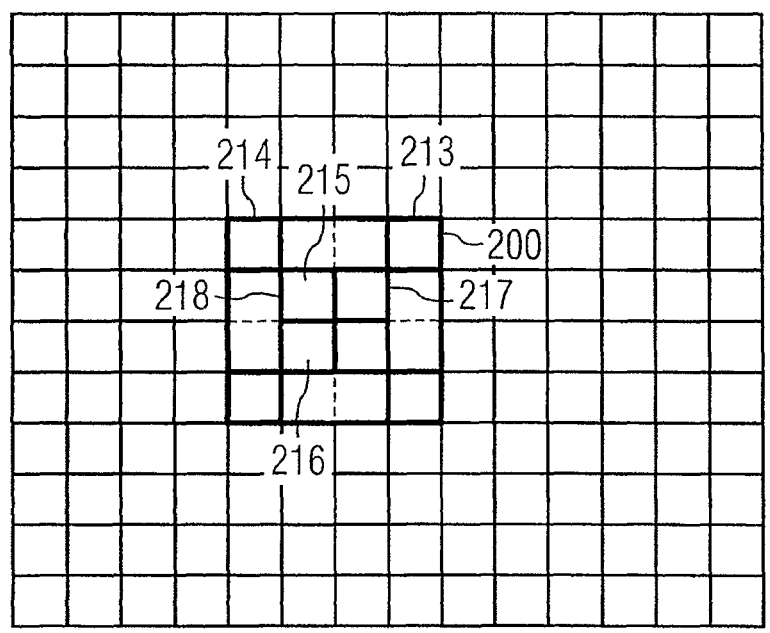

With reference to FIG. 7D, image block 211' is next divided in the horizontal direction by forming image blocks 217, 218, each one image block wide and two pixels high, and using the iterative method to assign a video information value to each of the pixels of these image blocks 217, 218.

It is optionally possible to proceed in the vertical direction with the division into blocks one pixel wide and four pixels high and to apply the iterative interpolation method to associate a video information value with each of the pixels of these blocks. In this case, a new video information value is interpolated for the pixels of the blocks 210, 211 adjacent the central region 211' in the vertical direction.

After these steps have been performed, a resolution at the pixel level has been attained for the image block 200 originally to be interpolated. The above-explained method can also be applied in corresponding fashion to image blocks having more than 4×4 pixels, the resolution in each case being enhanced in one-pixel steps starting from the margins.

In a fashion not illustrated in greater detail, it is also possible to divide the block to be interpolated more finely than its surroundings, that is, to divide the block down to sub-pixel resolution. Thus, with reference to FIGS. 7A-7D, the block 200 might for example be divided into 8×8 sub-pixels, 2×2 at a time being associated with one pixel, and to interpolate a pixel information value for each of these sub-pixels. After the completion of this method, the video information value of a pixel in question is formed from the information values of the subpixels associated with the pixel.

Such a procedure can be useful to obtain a satisfactory interpolation result for a central region, for example the region 211', for which the resolution initially remains coarser, if the resolution is enhanced symmetrically starting from the margin.

Figure 2:
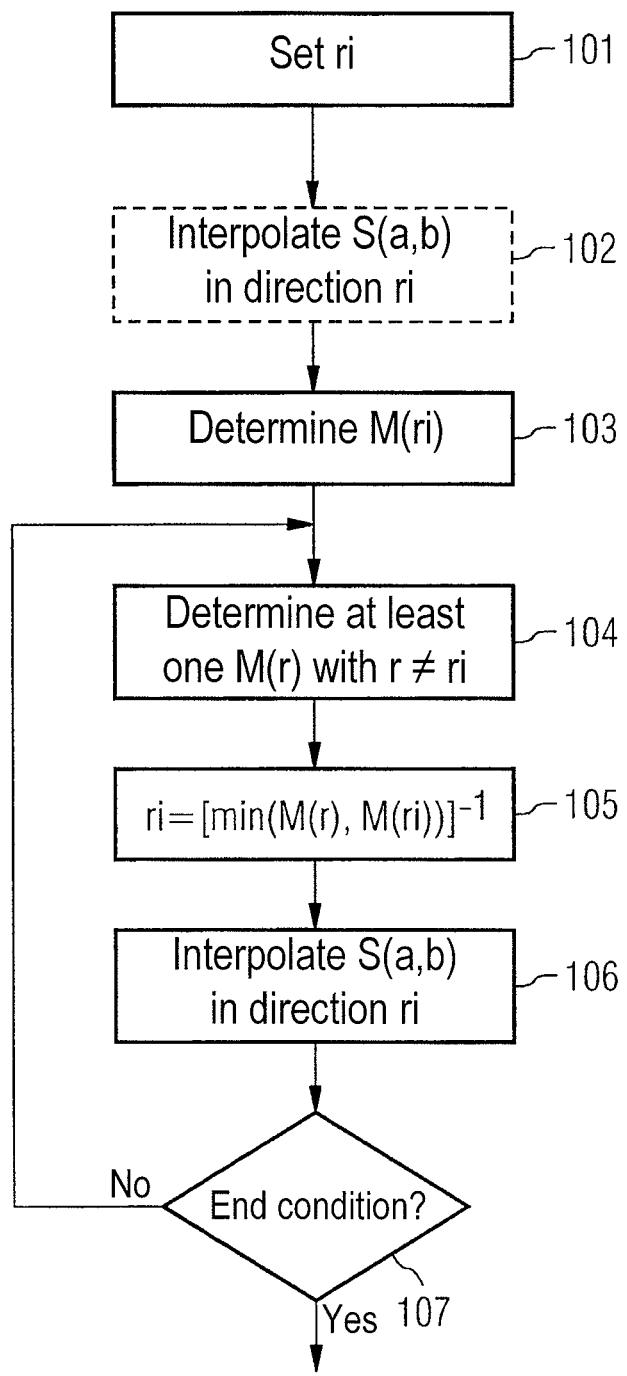
FIG. 2 illustrates a flow chart for the method.
Figure 8:
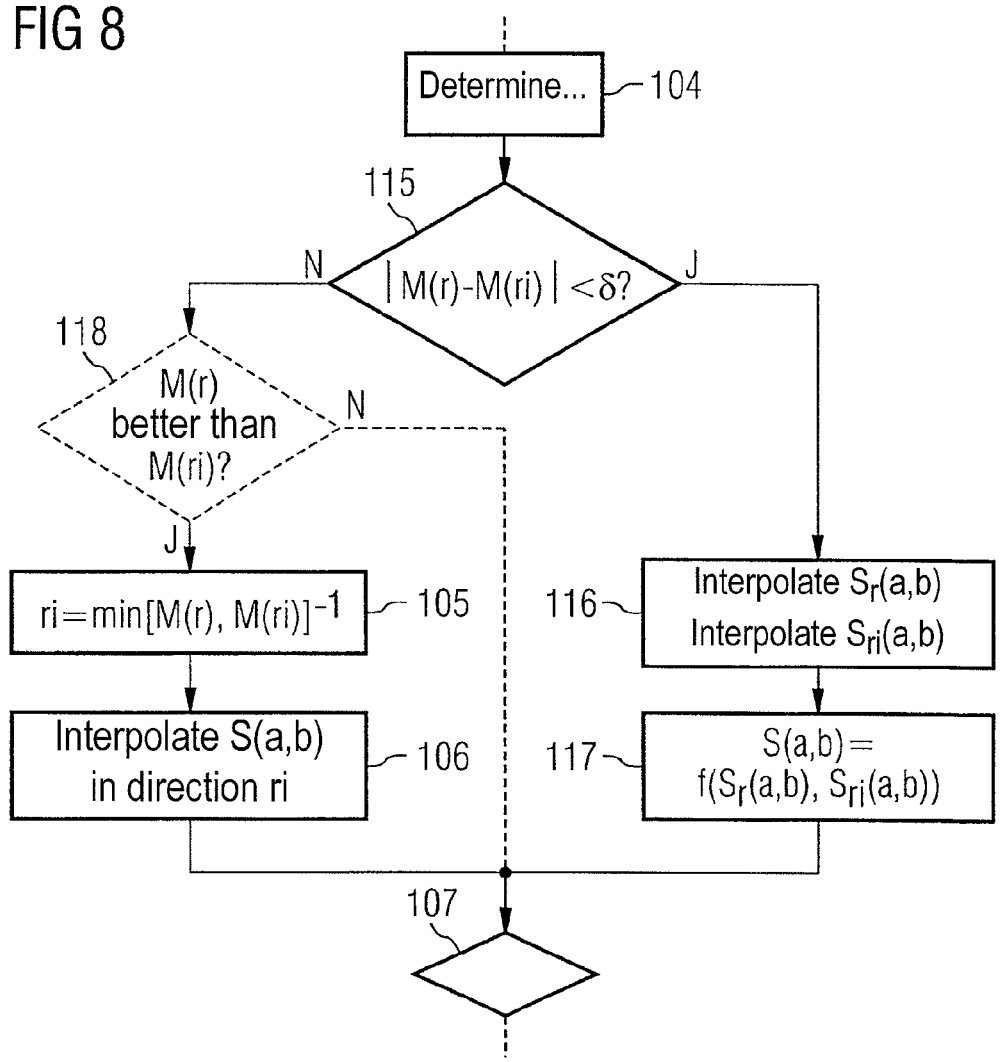
FIG. 8 illustrates a further exemplary embodiment of an interpolation method.

With reference to step 105 in FIG. 2, the above explanation of the method proceeded from the fact that during the iteration process one of two interpolation directions is selected at a time on the basis of a comparison of the figures of merit of these interpolation directions, and that interpolation is done in this selected direction. This selection presupposes that the figures of merit of these interpolation directions deviate from one another. In a modification of the previously explained method, provision is now made for employing both interpolation directions for interpolation if the absolute value of a difference in the figures of merit is smaller than a specified value δ. Steps 105, 106 explained in FIG. 2 are then supplemented by the steps explained in what follows with reference to FIG. 8.

After step 104, wherein the figure of merit M(r) is determined for at least one further interpolation direction r, this method goes on to a step 115 in which a test is performed to determine whether the absolute value of a difference in figures of merit is smaller than a specified difference value δ, that is, whether:

$$|M(r)-M(ri)|<\delta. \quad (14)$$

If this condition is satisfied, then in a step 116 two interpolations are performed, a first interpolation in interpolation direction r in order to obtain a first interpolation value $S_r(a, b)$, and a second interpolation in interpolation direction ri to obtain a second interpolation value $S_{ri}(a, b)$. Next these interpolation values are mixed to obtain the interpolation value S(a, b) employed in the further method. This mixing is done for example by weighted addition according to:

$$S(a,b)=g1\cdot S_r(a,b)+g2\cdot S_{ri}(a,b), \text{ where } g2=1-g1. \quad (15)$$

Here the weight factors g1, g2 can be specified as fixed, for example g1=g2=0.5. Alternatively, the weight factors g1, g2 can be dependent on the difference in the figures of merit, for example in that a greater weight is accorded to the interpolation value whose associated interpolation direction yields the smaller (better) figure of merit. The weight can be greater the larger the difference is.

The figure of merit of the best direction so far ri, which deviates by less than the value δ from the figure of merit of direction r, is saved in order to be compared with the figure of merit of a further direction r in a next iteration.

If condition (14) tested in step 115 is not satisfied, the previously explained steps 105 for determining the best direction ri and 106 for interpolating in this best direction ri are performed.

In order to save computing effort, the performance of the interpolation method in step 106 can be preceded by an optional step 118 in which a test is performed to determine whether the direction r newly tested during the iteration in question yields a better figure of merit than the comparison direction ri. An interpolation is performed only if this "new" direction yields a better result. The interpolation result S(a, b) determined so far, which with reference to step 117 can also be a mixing of at least two interpolation results, is saved until a "better" direction is determined.

In a modification of the method explained above with reference to FIG. 8, if condition (14) holds then the previous interpolation value obtained by interpolation in direction ri is retained instead of a mixture of two interpolation values $S_r(a, b)$, $S_{ri}(a, b)$. Steps 116, 117 are omitted in this alternative of the method.

In a further modification of the method, provision is made for performing the above-explained iterations to determine the best interpolation direction in parallel for a plurality of adjacent image regions of an image, to obtain a first interpolation direction for each image region during an iteration. These interpolation directions, or the directors representing the interpolation directions, are filtered in order to obtain a filtered interpolation direction for each image region. A subsequent interpolation is carried out for each image region in the direction of the filtered interpolation direction.

Figure 9:
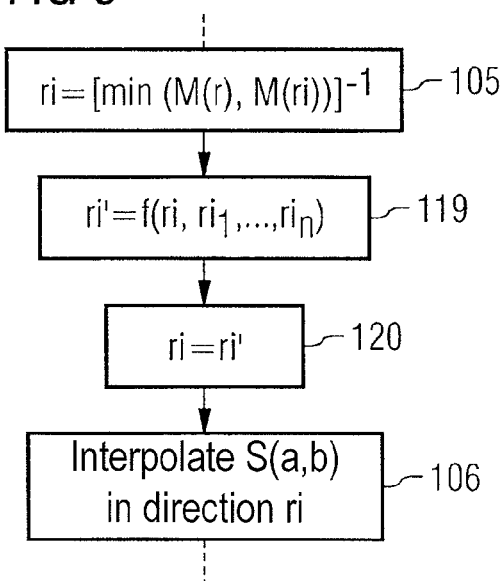
FIG. 9 illustrates yet another embodiment of a method wherein an interpolation direction of an image region is obtained by applying filtering with allowance for interpolation directions to the image regions positionally adjacent the image region.

FIG. 9 illustrates a method so modified with reference to the signal-flow diagram, only the steps modified from the previously explained method being illustrated. Between step 105, in which the best interpolation direction ri is determined during each interpolation step for an image region, which is referred to as the current image region in what follows, and step 106, in which interpolation is performed, in this method there is a step 119 in which filtering is performed to filter the best interpolation direction so far for the current image region, the best interpolation directions determined so far for adjacent image regions being taken into consideration. This is described by:

$$ri'=f(ri,ri_1,\ldots,ri_n), \quad (16)$$

wherein ri' denotes the filtered interpolation direction; ri denotes the best interpolation direction so far for a given image region; $ri_1, \ldots, ri_n$ denote the best interpolation directions so far for adjacent image regions; and f(.) denotes a filter function. This filtering can be performed during each iteration. What is more, it is also possible to perform this filtering just once at the end of the iteration process, when the best interpolation direction exists for each image region. These best interpolation directions are then filtered to obtain filtered interpolation directions before a final interpolation is done in the filtered interpolation directions.

Figure 10:
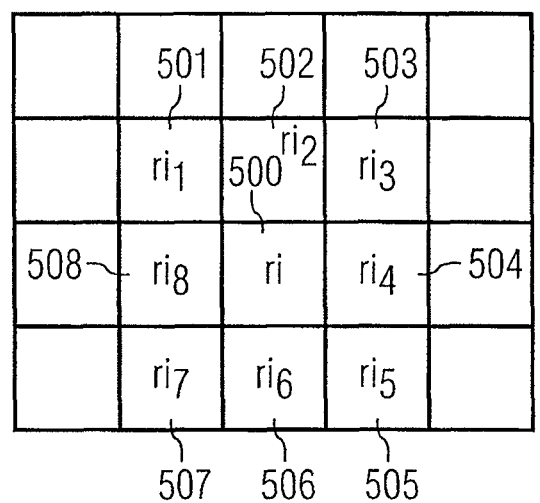
FIG. 10 depicts by way of example the image regions taken into consideration in the filtering of the method according to FIG. 9.

Starting from an image in which individual image regions are arrayed in matrix fashion, what is taken into consideration for filtering the interpolation direction of a current image region is for example the interpolation directions of all image regions immediately adjacent the current image region. This procedure is illustrated in FIG. 10, in which individual image regions 500-508 and the best interpolation directions $ri-ri_8$ associated with the respective image regions 500-508 are illustrated. Immediately adjoining the image region 500 with interpolation direction ri are eight image regions 501-508 with interpolation directions $ri_1, \ldots, ri_8$.

The filtering that associates a filtered interpolation direction ri' with the current image region 500 having the best interpolation direction ri so far is for example median filtering, the inputs to which are the interpolation direction of the current region and the interpolation directions of the eight surrounding regions and the output from which, as the filtered interpolation direction, is the median of this total of nine interpolation directions. If the image directions r are so normalized that one direction component is always unity, filtering of the other direction components of the image directions is sufficient.

The interpolation directions of the image regions can be updated while still being filtered, so that, as applicable, already filtered interpolation directions are employed in the filtering of further image regions during one filter pass. The filter result can, however, depend on the sequence in which the filtered interpolation directions are determined for the individual image regions. If this dependence is to be avoided, then only the first interpolation directions—i.e., those determined before the filter pass—are taken into account in determining filtered interpolation directions for a group of image regions.

The filtered interpolation direction ri' obtained in the above-explained fashion is taken as best interpolation direction for the current image region (step 120) and provides the basis for interpolation in step 106.

It should be pointed out that individual ones or all of the image regions 501-508 surrounding the image region 500 to be interpolated can also be original image regions for which items of video information already exist. For such original image regions, the same iterative steps with which an interpolation direction is determined for an image region to be interpolated can be used to determine interpolation directions that are afterward employed for filtering.

In this embodiment of the method, the interpolation direction associated with each image region of a current image at the completion of the iterative method, that is, after the end condition has been satisfied in step 107, is subjected to "temporal filtering" before a final interpolation is performed. At least one interpolation direction, associated, in at least one image temporally adjacent the current image, with an image region located at the same position as the current image region, is used for filtering the interpolation direction of a current image region of a current image. The final interpolation to determine an interpolated image region of a current image is thus carried out in an interpolation direction ri" for which:

$$ri''=f(ri,ri_{t-1}). \qquad (17)$$

Figure 11:
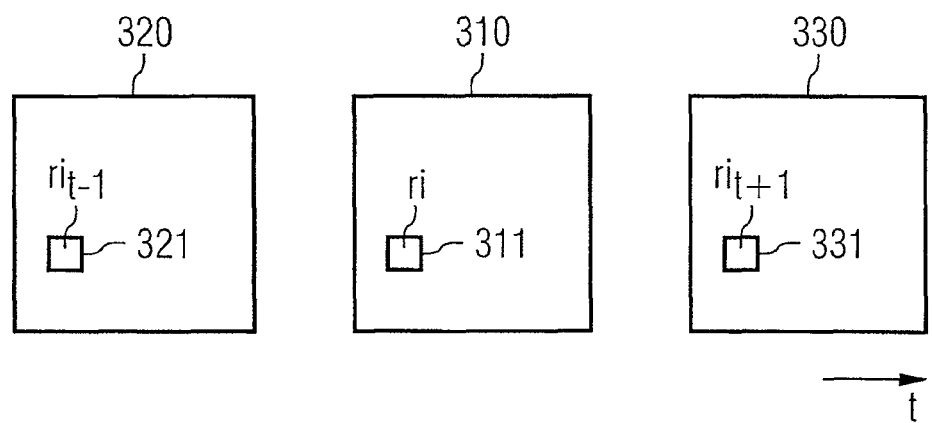
FIG. 11 illustrates an exemplary embodiment of a method wherein an interpolation direction of an image region is obtained by applying filtering with allowance for interpolation directions to the image regions temporally adjacent the image region.

Here ri denotes a best interpolation direction determined for the image region of the current image after the completion of all iterations; $ri_{t-1}$ denotes the best interpolation direction after the completion of all iterations for an image region of a temporally adjacent image that in this image is located at the same spatial position as the current image region in the current image. This procedure is illustrated in FIG. 11, wherein the reference character 310 identifies a current image and the reference characters 320 and 330 identify two images temporally adjacent the current image. The reference characters 311, 321, 331 identify image regions at like spatial positions in the individual images, with each of which there are associated interpolation directions that were determined with the above-explained iterative method. Here an interpolation direction obtained by filtering the interpolation directions of the image regions spatially located at the same position but temporally succeeding one another is employed in the interpolation of the current image region 311.

In the method explained previously, original or already interpolated video information values of image regions of the same image are employed for interpolating a video information value for an image region of an image. In these methods interpolation is done only with the use of items of video information from one image. The iterative interpolation method explained is, however, also suitable for interpolating so-called intermediate images, that is, images lying temporally between two images, as is explained in what follows with reference to FIG. 12.

Figure 12:
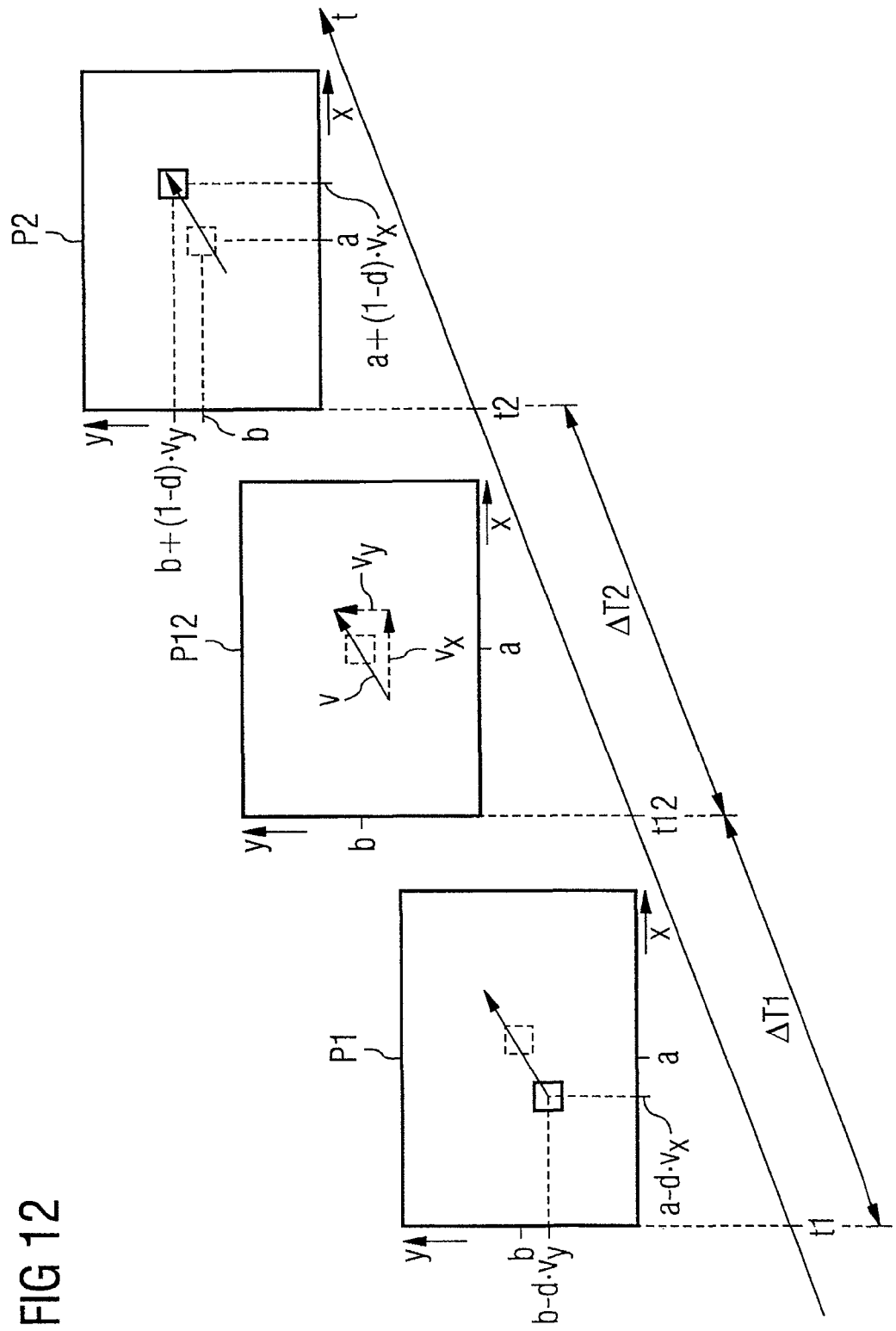
FIG. 12 illustrates an interpolation in one temporal and one spatial interpolation direction using a motion vector.

FIG. 12 illustrates schematically an image sequence having temporally successive images. Illustrated in FIG. 12 are three images, a first image P1 at a time t1, a second image P2 at a time t2 and a third image P12 at a time t12 lying temporally between the first and second images. Each of the individual images P1, P2, P12 comprises a number of image regions arrayed for example in matrix fashion, which in the example are pixels with each of which at least one video information value, for example a luminance value and at least one chrominance value, is associated. For purposes of explanation it is initially assumed that the first and second images P1, P2 are each original images wherein a video information value has already been assigned to each pixel and that the third image P12 is an intermediate image to be interpolated temporally between the first and second images P1, P2, in which intermediate image a video information value is to be interpolated for every pixel. Video information values for pixels of these images P1, P2, P12 are symbolized in what follows by $S_1(x, y)$, $S_2(x, y)$, $S_{12}(x, y)$, x and y standing for the coordinates of the pixels in the individual images.

An objective in intermediate-image interpolation is to take correct account of motion processes. If in the first image for example an object is located at a first position within the image and in the second image it is located at a second position, then this object is to be represented in the intermediate image at a third position lying between the first and second positions, the distance from this third position to the first and second positions being proportional to the temporal spacing of the intermediate image relative to the first image and the second image. The motion of the object from the first position in the first image to the second position in the second image is characterized by a so-called motion vector, which gives the change in position from the first image to the second image.

For purposes of explanation, consider a pixel at a position (a, b) in intermediate image P12. To interpolate a video information value $S12(a, b)$ for this pixel, video information values of respectively at least one pixel in the first image and at least one pixel in the second image are employed, these pixels lying adjacent the position (a, b) of the pixel to be interpolated in an interpolation direction specified by the motion vector $v=(v_x, v_y)$. For interpolation using just two pixels:

$$S_{12}(a,b)=LP[S_1(a-d\cdot v_x, b-d\cdot v_y); S_2(a+(1-d)\cdot v_x, b+(1-d)\cdot v_y)], \qquad (18)$$

wherein LP denotes low-pass filtering and $v_x$ and $v_y$ are components of the motion vector. Here $d\cdot v_x$ and $d\cdot v_y$ denote the distances from the pixel to be interpolated to the pixel in the first image P1 used for interpolation, and $(1-d)\cdot v_x$ and $(1-d)\cdot v_y$ denote the distances from the pixel to be interpolated to the pixel in the second image P2 used for interpolation. Now d is given by:

$$d=\Delta T1/(\Delta T1+\Delta T2) \qquad (19)$$

wherein $\Delta T1$ is the temporal distance from the intermediate image P12 to the first image and $\Delta T2$ is the temporal distance from the intermediate image to the second image. If the intermediate image lies temporally halfway between the first and second images P1, P2, then $\Delta T1=\Delta T2$ and so $d=1-d=0.5$.

If there is no motion, the motion vector is a zero vector. The pixels in the first and second images P1, P2 lying in these images at the position of the pixel to be interpolated are then used for interpolation, so that:

$$S_{12}(a,b)=LP[S_1(a,b); S_2(a,b)]. \qquad (20)$$

The motion vector needed for interpolation specifies a spatial and temporal interpolation direction, the pixels of the first and second pixels employed for interpolation being adjacent, in this spatial and temporal interpolation direction, to the position of the pixel to be interpolated. This means that the positions of the pixels employed for interpolation lie adjacent, in the interpolation direction, the position of the pixel to be interpolated but that these pixels originate from temporally spaced images P1, P2.

As explained above with reference to FIGS. 1 to 11, the iterative method for determining a solely spatial interpolation direction, that is, an interpolation direction within one image, can be correspondingly applied to the determination of a spatial and temporal interpolation direction, that is, a motion vector, as will be explained in what follows with reference to FIG. 13, in which a flow chart for this method is illustrated.

In a first step 101, a starting vector vi is selected. This starting vector is for example a zero vector. In a next step 102, this starting vector is employed in determining a first interpolation value $S_{12}(a, b)$ for the pixel to be interpolated. This interpolation is done for example using equation (8), the starting vector being employed as motion vector.

A figure of merit M(vi) for this starting vector vi is determined in a next step 203. The determination of this figure of merit M(vi) can comprise the determination of a plurality of individual figures of merit M'(vi), one individual figure of merit being determined for each group of pixels exhibiting at least one pixel in the first image P1, one pixel in the intermediate image P12 and one pixel in the second image P2. The individual figures of merit are determined for example by high-pass filtering of the video information values associated with the pixels of a group.

Figure 14:
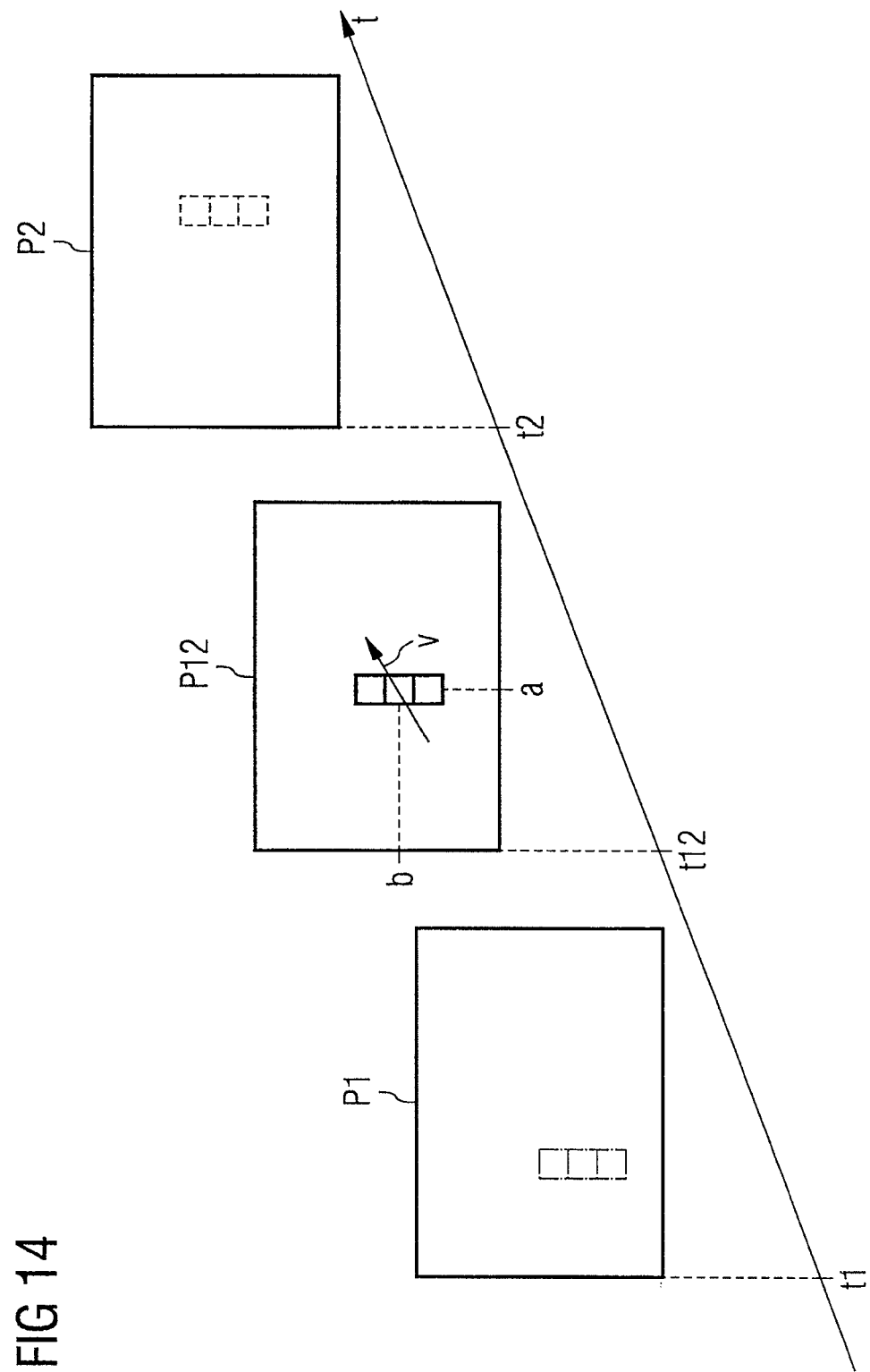
FIG. 14 depicts an example for groups of pixels employed for determining a figure of merit for a motion vector.
Figure 15:
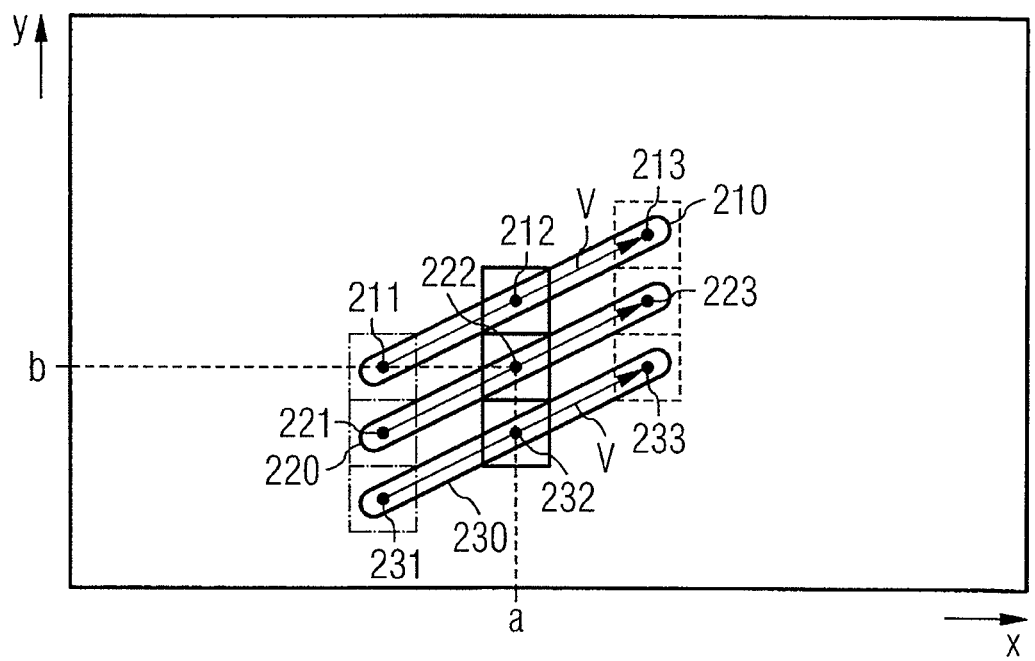
FIG. 15 illustrates the position in an image of the pixel groups shown in FIG. 14.

An example of a method for determining a figure of merit for a motion vector v is explained in what follows with reference to FIGS. 14 and 15.

By way of example, FIG. 14 depicts three groups of pixels, each exhibiting a first pixel in the first image P1, a second pixel in the second image P2 and a third pixel in the intermediate image P12. In each group the first pixel lies at the initial point of the motion vector v to be examined, the second pixel lies at the final point of this motion vector v and the third pixel lies on the motion vector v. The positioning of the individual pixels of the individual groups becomes clear with reference to FIG. 15, which depicts these pixels in one image. In correspondence with FIG. 14, the first pixels are represented by dot-dash lines, the second pixels are represented by dashed lines and the third pixels are represented by solid lines. In FIG. 15 the groups are each visualized by solid lines that enclose the individual pixels of a group. Moreover, the motion vector v to be examined is illustrated in FIG. 15 for each of these groups. The three distinct groups are identified in FIG. 15 by the reference characters 210, 220, 230. The reference characters 211, 221, 231 identify the first pixels of the respective groups, originating from the first image P1; the reference characters 213, 223, 233 identify the second pixels of the respective groups, originating from the second image P2; and the reference characters 212, 222, 232 identify the third pixels of the respective groups, originating from the intermediate image P12. The groups of pixels employed for determining a figure of merit for a given motion vector can comprise the pixel to be interpolated, as is the case in the example illustrated in FIG. 15, wherein this pixel to be interpolated is contained in the second group 220 at the position (a, b).

The determination of an individual figure of merit for the motion vector v for a group of pixels is carried out in accordance with the explanations to equations (3) and (4), for example by high-pass filtering of the video information values associated with the pixels of a group. An individual figure of merit $M'(v)_{210}$ for the motion vector v and the first group 210 is determined for example as:

$$M'(v)_{210}=HP[S211,S212,S213]. \quad (21)$$

Here HP[.] denotes high-pass filtering, for example with the filter coefficients 0.25, 0.5 and −0.25.

A figure of merit M(v) for the motion vector v is determined in accordance with the discussion of equations (5a) and (5b) by adding the absolute values of the individual figures of merit or of even powers of the individual figures of merit.

Figure 16:
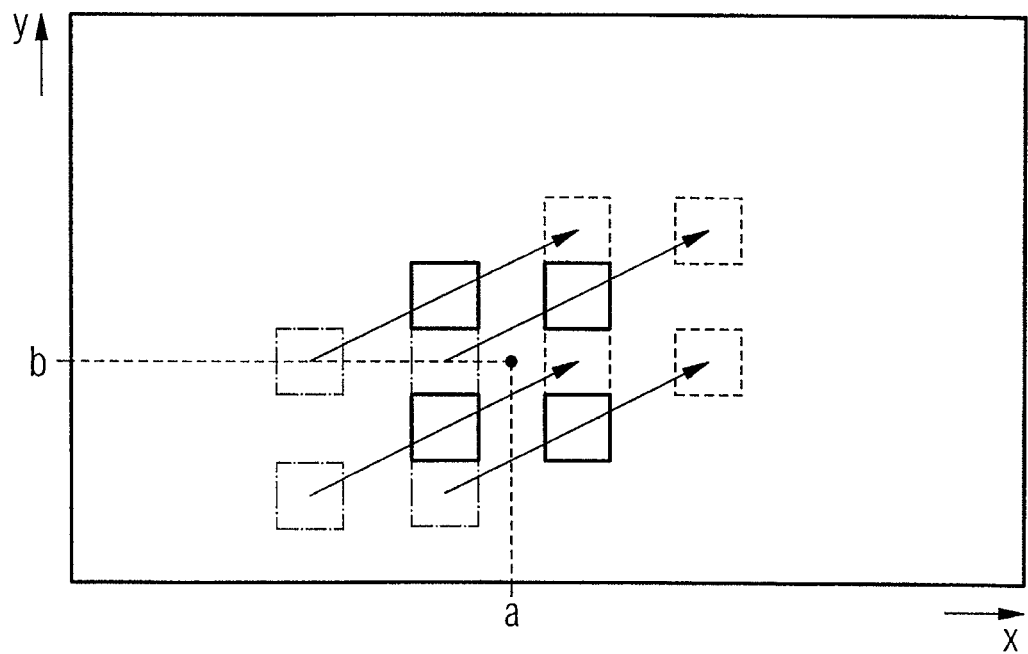
FIG. 16 depicts a further example for pixel groups employed in order to determine a figure of merit for a motion vector.

The groups of pixels used in order to determine a figure of merit for a given motion vector v can be chosen arbitrarily. FIG. 16 depicts a further example of such pixel groups, the positions of the pixels originating from the first image P1 again being represented by dot-dash lines, the positions of the pixels originating from the second image again being represented by dashed lines and the positions of the pixels originating from the intermediate image again being represented by solid lines. In the example illustrated in FIG. 16, the third pixels originating from the intermediate image are arrayed about the pixel to be interpolated at position (a, b). The pixel groups illustrated thus do not contain the pixel to be interpolated.

After a figure of merit for the chosen starting vector has been determined in the above-explained fashion, a motion vector deviating from the starting vector is selected in a next step 104 (with reference to FIG. 13) and a figure of merit is determined for this motion vector.

The figures of merit being taken into consideration, the "better" of these two motion vectors is selected (step 105). The (provisionally) selected motion vector is then used for interpolating a video information value for the pixel (a, b) to be interpolated. The interpolation can be done in accordance with equation (10) in such fashion that only pixels of the first and second images P1, P2 are selected. Along with pixels in the first and second images P1, P2 lying at the initial point and at the final point of the selected motion vector, however, a pixel previously interpolated for the pixel (a, b) can also be used in the interpolation. The video information values of these three pixels can be subjected for example to low-pass filtering for interpolation. It should be pointed out that when the selected motion vector is employed, further pixels at pixels lying temporally before the first image P1 or temporally after the second image P2 can be selected and used for interpolation.

In accordance with the discussion of equation (10), it is also possible that the video information values of pixels that were employed in order to determine the figure of merit for the selected motion vector can be employed for interpolating a video information value for the pixel (a, b).

In a next step 107, a test is performed to determine whether a specified end condition has been attained. Such an end condition holds for example if the figure of merit determined for the last-selected motion vector is better than a specified limiting value or when a specified number of iterations has been reached. If this end condition has been attained, the previously determined interpolation value is retained as the video information value for the pixel (a, b) to be interpolated. If this end condition has not been attained, a new motion vector deviating from the last-selected motion vector vi is selected and, in step 104, a figure of merit is determined for this new motion vector. The next action is to perform again the steps 105, 106 already explained.

Figure 13:
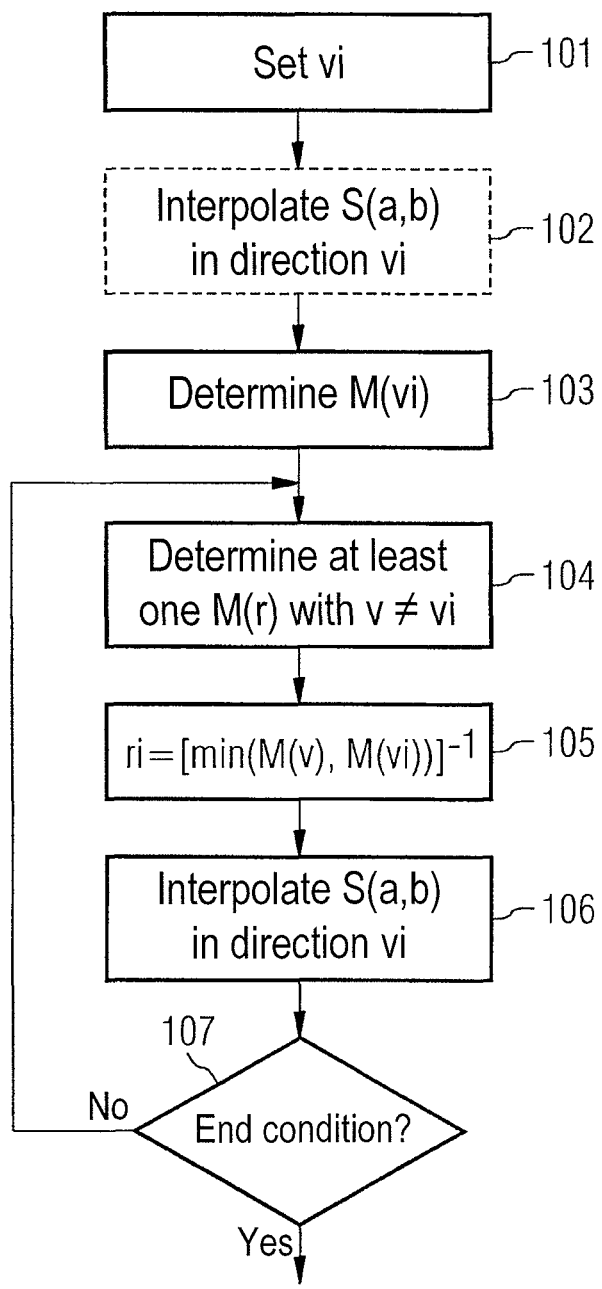
FIG. 13 illustrates the procedural sequence of an iterative interpolation method using motion vectors.

In the processing sequence illustrated in FIG. 13, interpolation is done with a selected motion vector even before the test to determine whether an end condition has been attained.

If this end condition has not been attained, so that a further motion vector is to be examined by determining its figure of merit, and if the groups of pixels examined for determining the figure of merit do not contain the pixel to be interpolated (as illustrated in the example according to FIG. 16), then interpolation can be dispensed with during the individual iterations. An interpolation using the finally selected motion vector is then done after the end condition has been attained according to step 107.

The discussion to FIGS. 8 to 11, which concern interpolation using pixels within the same image, are correspondingly applicable to interpolation using motion vectors, that is, interpolation using pixels from temporally spaced images. The flow chart of FIG. 8 holds correspondingly for motion vectors if spatial and temporal interpolation directions—which is to say motion vectors—are employed instead of the interpolation directions within one image as explained in connection with FIG. 8.

The modified flow chart of FIG. 9 is also correspondingly applicable to motion vectors. A motion vector selected for a pixel in the course of one pass of the iterative method can thus be composed from a plurality of motion vectors of spatially adjacent (FIG. 10) or temporally adjacent (FIG. 11) pixels.

In the preceding discussion of motion-vector-based interpolation methods, it is assumed that a video information value is to be interpolated for a pixel of an intermediate image. The method is not, however, limited to such intermediate-image interpolation. For example, a motion-vector-based pixel interpolation can also be employed for example in intermediate-line interpolation, explained at the outset, as will be explained in what follows with reference to FIG. 17.

Figure 17:
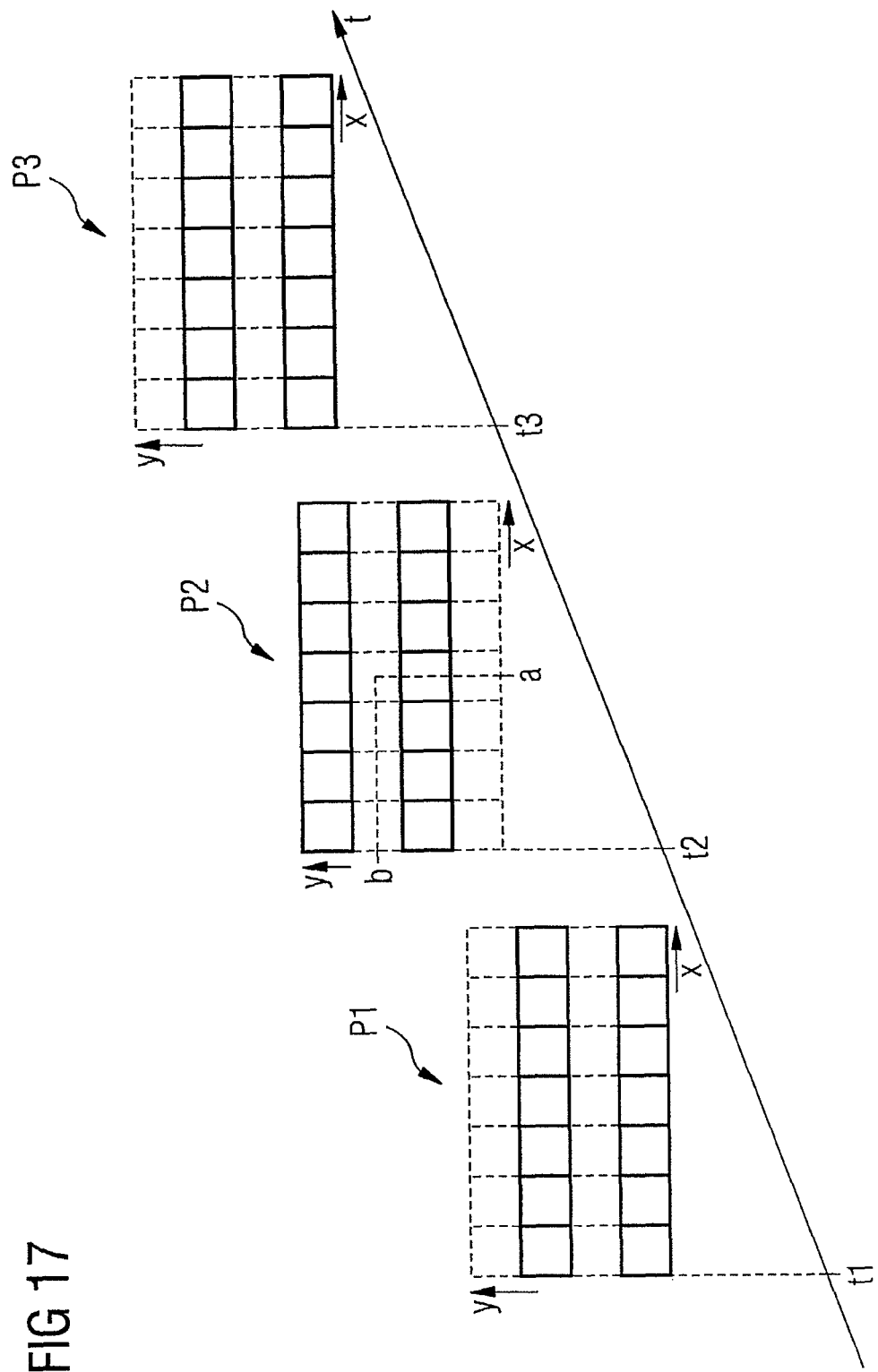
FIG. 17 illustrates motion-vector-based intermediate-line interpolation.

FIG. 17 depicts schematically an image sequence having three temporally successive images P1, P2, P3, which in the example are line-interleaved fields. The above-explained motion-vector-based interpolation method can be employed in order to interpolate a video information value for a pixel (a, b) of an intermediate line of the second image P2, lying temporally between the first and third images P1, P3. When a figure of merit is determined for the motion vectors examined in the context of the individual iterations, no interpolation values need be determined for those pixels of the second image P2 that are original pixels; instead, the original pixels are employed for determining the figure of merit.

Motion-vector-based interpolation is of course not limited to the interpolation of an intermediate line. Such motion-vector-based interpolation can also be employed for example in image scaling, as was explained with reference to FIGS. 3A and 3B. In such a scaling method, instead of seeking pixels only within one image in order to determine an interpolation value, as in the method according to FIGS. 3*a* and 3*b*, it is also possible when using the explained motion vectors to seek pixels for interpolation in temporally adjacent images.

The above-explained motion-vector-based interpolation method is also suitable for the interpolation of entire image blocks, as was explained with reference to FIGS. 5 to 7. Instead of seeking interpolation pixels only within the image in which an image region is to be interpolated, it is thus also possible to seek pixels for interpolation in temporally adjacent images.

The methods, explained with reference to FIGS. 1 to 5, for interpolating an image region using image regions in the same image can of course also be combined with the motion-vector-based interpolation methods explained with reference to FIGS. 12 to 16. Such a procedure is illustrated in general fashion in FIG. 17, in which an image sequence having three temporally successive images is illustrated schematically. Let it be supposed that a pixel at a position (a, b) of a second image P2 lying temporally between the first and third images P1, P3 is to be interpolated. Pixels suitable for the interpolation are sought first within the second image P2, as is schematically illustrated in FIG. 17 by a director r representing an interpolation direction. Now pixels suitable for interpolation are also sought in the temporally adjacent images P1, P3, as is schematically illustrated in FIG. 17 by a motion vector v. In this method either an interpolation direction within the image P2 or a temporal and spatial interpolation direction, that is, a motion vector, is generally determined by the interpolations explained at length above.

Although the present invention has been illustrated and described with respect to several preferred embodiments thereof, various changes, omissions and additions to the form and detail thereof, may be made therein, without departing from the spirit and scope of the invention.

What is claimed is:

1. An iterative interpolation method for determining an interpolated video information value in an image that includes a number of image regions arrayed in matrix fashion, at least one of which is an image region to be interpolated, and that is disposed temporally between a first image and a second image of an image sequence, the method comprising:
   a) specifying, by an image processing unit, a starting motion vector;
   b) determining, by an image processing unit, for the starting motion vector a figure of merit, which depends on video information values of at least one group of image regions, this group of image regions comprising at least one image region in the first image, at least one image region in the second image and at least one image region in the image to be interpolated, the position of these image regions in the images being specified by the starting motion vector, wherein the figure of merit is the absolute value of a high-pass filter value that is obtained by applying a high-pass filter to the video information values;
   c) selecting, by an image processing unit, at least one motion vector distinct from the starting motion vector and determining a figure of merit for this at least one motion vector;
   d) comparing, by an image processing unit, the figures of merit for the starting motion vector and the at least one motion vector distinct from the starting motion vector, selecting the starting motion vector or the at least one other motion vector in dependence on the comparison result and determining an interpolated video information value using image regions that lie in the first and second images at positions specified by the selected motion vector or specified by a motion vector obtained by filtering the selected motion vector; and
   e) repeating steps c) and d) at least once, the motion vector selected in the preceding step d) being employed as the starting motion vector, and the figure of merit of this selected motion vector as the figure of merit of the starting motion vector, when step c) is next performed.

2. The method of claim 1, wherein steps c) and d) are repeated until a specified end condition has been attained.

3. The method of claim 2, wherein the end condition has been attained when a specified number of iterations has been reached.

4. The method of claim 2, wherein the end condition has been attained when the figure of merit associated with the interpolation direction in step d) satisfies a specified condition.

5. The method of claim 1, wherein a new motion vector distinct from the starting interpolation direction is selected every time step c) is performed.

6. The method of claim 1, wherein the at least one of the groups of image regions used in order to determine a figure of merit comprises the image region to be interpolated.

7. The method of claim 6, wherein, before a first performance of step b), there is associated with the image region to be interpolated a starting interpolation value, which is generated by filtering of video information values of a group of image regions disposed in the first and second images at positions specified by the starting motion vector.

8. The method of claim 1, wherein the at least one group of image regions for determining the figure of merit exhibits at least one further image region to be interpolated and wherein, before a first performance of step b) for the image region to be interpolated, step a) is performed for the at least one further image region to be interpolated, and wherein, before every repetition of steps c) and d) for the image region to be interpolated, steps c) and d) are performed for the at least one further image region to be interpolated.

9. The method of claim 8, wherein steps c) and d) are performed for the at least one further image region to be interpolated only if the end condition for this further image region to be interpolated has not been attained.

10. The method of claim 1, wherein at least two groups of image regions are employed in order to determine a figure of merit.

11. The method of claim 1, wherein steps a) to d) are performed in parallel for a plurality of adjacent image regions and wherein the filtered motion vector for a first image region is obtained in step d) by filtering of the motion vector of the first image region and of at least one image region lying adjacent the first image region.

12. The method of claim 1, wherein the only image regions employed in order to generate an interpolated video information value are original image regions.

13. The method of claim 1, wherein the image regions are pixels and wherein the video information values are luminance values or chrominance values.

* * * * *